(12) United States Patent
Garrubba

(10) Patent No.: US 12,433,721 B2
(45) Date of Patent: Oct. 7, 2025

(54) FASTENING CHANNEL THROUGH A DENTAL RESTORATION

(71) Applicant: EXOCAD GMBH, Darmstadt (DE)

(72) Inventor: David Garrubba, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 912 days.

(21) Appl. No.: 17/668,502

(22) Filed: Feb. 10, 2022

(65) Prior Publication Data

US 2023/0248480 A1 Aug. 10, 2023

(51) Int. Cl.
*A61C 8/00* (2006.01)
*A61C 9/00* (2006.01)
*A61C 13/00* (2006.01)
*G06F 3/00* (2006.01)
*G06F 30/10* (2020.01)
*G06F 30/20* (2020.01)
*G06F 15/78* (2006.01)

(52) U.S. Cl.
CPC .......... *A61C 8/0068* (2013.01); *A61C 8/0037* (2013.01); *A61C 9/002* (2013.01); *A61C 13/0004* (2013.01); *G06F 3/00* (2013.01); *G06F 30/10* (2020.01); *G06F 30/20* (2020.01); *G06F 15/78* (2013.01); *G06T 2200/04* (2013.01)

(58) Field of Classification Search
CPC ..... A61C 8/0068; A61C 8/0037; A61C 9/002; A61C 13/0004; A61C 8/0048; A61C 8/0075; A61C 13/08; G06F 3/00; G06F 30/10; G06F 30/20; G06F 15/78; G06T 2200/04
See application file for complete search history.

(56) References Cited

U.S. PATENT DOCUMENTS

| | | |
|---|---|---|
| 10,034,725 B2 | 7/2018 | Elsner |
| 2015/0202024 A1* | 7/2015 | Fisker .................... G16H 20/40 433/213 |
| 2019/0125498 A1* | 5/2019 | Bernhard ............. A61C 8/0068 |
| 2020/0289243 A1 | 9/2020 | Jinton |

OTHER PUBLICATIONS

Edmondson EK, Trejo PM, Soldatos N, Weltman RL. The ability to screw-retain single implant-supported restorations in the anterior maxilla: a CBCT analysis. The Journal of Prosthetic Dentistry. Sep. 1, 2022;128(3):443-9. (Year: 2022).*

* cited by examiner

*Primary Examiner* — Chuen-Meei Gan
(74) *Attorney, Agent, or Firm* — Perry + Currier Inc.

(57) ABSTRACT

The invention relates to a method for a computer-implemented method for configuring a fastening channel through a dental restoration for fastening a retaining means retaining the dental restoration. The method comprises receiving a 3D digital restoration model of the dental restoration with an artificial tooth and a definition of an implant. A relative positioning of the dental restoration relative to the implant is determined. A position of the fastening channel extending from the implant through the artificial tooth is determined. In case the position of the fastening channel violating a set of one or more pre-defined positioning criteria. The position of the fastening channel is automatically adjusted by angulating the fastening channel such that the positioning criteria are satisfied.

45 Claims, 16 Drawing Sheets

FASTENING CHANNEL THROUGH A DENTAL RESTORATION

The invention relates to the field of dental technology. More particularly, the invention relates to a computer-implemented method for configuring a fastening channel through a dental restoration for fastening a retaining means retaining the dental restoration. The invention furthermore relates to a computer device and a computer program product for providing a physical testing model for configuring a fastening channel as well as to a manufacturing system comprising the computer device.

In order to retain a dental restoration at an implant using retaining means, a fastening channel extending through the dental restoration may be required. The retaining means are inserted into the fastening channel and placed in position at the implant. Via the fastening channel, the retaining means are fastened in order to retain the dental restoration at the implant. However, a position and orientation of the implant may strongly depend on individual anatomical features of a patient's jaw. Thus, depending on a relative position and orientation of the implant relative to the dental restoration it may be challenging to implement fastening channel through the dental restoration for fastening the retaining means at the implant.

It is an objective to provide for a computer-implemented method, a computer device and computer program product for configuring a fastening channel through a dental restoration for fastening a retaining means retaining the dental restoration. Furthermore, it is an objective to provide for a manufacturing system for manufacturing a dental restoration with a fastening channel.

In one aspect, the invention relates to a computer-implemented method for configuring a fastening channel through a dental restoration for fastening a retaining means retaining the dental restoration.

The method comprises receiving a 3D digital restoration model of the dental restoration. The dental restoration comprises an artificial tooth. A definition of an implant is received configured to receive the retaining means to retain the dental restoration on the implant. The definition of the implant comprises a central longitudinal axis of the implant. A relative positioning of the dental restoration relative to the implant is determined. A position of the fastening channel extending from the implant through the artificial tooth is determined. The fastening channel comprises a first end and a second end. The first end is a connecting end providing a connection to the implant. The second end is a mouth within an outer surface of the artificial tooth configured for receiving a fastening means for fastening the retaining means to retain the dental restoration on the implant.

In case the position of the fastening channel violates a set of one or more pre-defined positioning criteria, the position of the fastening channel is automatically adjusted by angulating the fastening channel such that the positioning criteria are satisfied. The angulating of the fastening channel comprises tilting a first straight section of the fastening channel relative to a second straight section of the fastening channel. The second straight section is a straight extension of the central longitudinal axis of the implant extending from the first end of the fastening channel to the first straight section. The first straight section extends from the second straight section to the second end of the fastening channel.

Examples may have the beneficial effect, that a fastening channel may be automatically adjusted based on a relative positioning of the dental restoration relative to the implant. The relative positioning may comprise a relative position and/or a relative orientation. The relative positioning may be a predefined positioning received with the 3D digital restoration model and the definition of the implant or a positioning executed dynamically using the 3D digital restoration model and the definition of the implant.

The definition of the implant at least comprises a definition of the central longitudinal axis of the implant. The definition may, e.g., comprise further information regarding the position, orientation and/or geometric form of the implant. For example, the definition of the implant may comprise a 3D digital implant model of the implant. The 3D digital implant model of the implant may, e.g., be a pre-defined 3D digital implant model. The 3D digital implant model of the implant may, e.g., be a generic 3D digital implant model. The position of the implant may, e.g., be selected using a 3D digital jaw model of the patient. The 3D digital jaw model may provide a digitized copy of the bone structure of the jaw. The 3D digital jaw model may be provided as part of a 3D digital dentition model, which further may, e.g., further comprise a 3D digital teeth model of teeth of the patient.

Using the 3D digital jaw model, the structural conditions in and around the jawbone may be taken into account, when planning an implant position and orientation. When determining position and orientation for an implant, care may be taken, e.g., to ensure that the jaw nerve, i.e., the mandibular or maxillary nerve, is not damaged by the implant being arranged at the planned position with the planned orientation. Care may be taken, that the bone wall or bone walls around the planned position for the implant with the planned orientation have a sufficient minimum thickness on all sides to provide sufficient support for the respective implant. Care may be taken, that no main veins are hit by the implant being arranged at the planned position with the planned orientation. The implant position and orientation for the implant may have to be precisely defined.

For example, 3D scanning and visualization techniques may be used for planning position and orientation of an implant. For acquiring 3D scan data of the patient's jaw structure, e.g., a computer tomography scan, i.e., a CT scan, may be used. A CT scan provides computer-processed combinations of multiple X-ray measurements taken from different angles to produce tomographic, i.e., cross-sectional images. For example, a focal plane tomography may be used with images of multiple planes being taken to generate, e.g., a composite panoramic image. For example, scan data acquired using cone-beam computed tomography (CBCT), also referred to as digital volume tomography (DVT), may be used. CBCT consists of X-ray computed tomography with divergent X-rays forming a cone.

The dental restoration defined by the 3D digital restoration model comprises an artificial tooth, e.g., a in form of a crown. The 3D digital restoration model may, e.g., comprise further element, like an abutment. One or more elements of the 3D digital restoration model may, e.g., be selected from one or more sets of pre-defined elements. The artificial tooth is, e.g., a library tooth and provided by selecting the 3D digital artificial tooth model from a set of 3D digital artificial tooth models of library teeth. For example, an abutment to be used in combination with the artificial tooth may be selected in form of a 3D digital abutment model from a set of 3D digital abutment models, e.g., an abutment library. The selected pre-defined elements may, e.g., be adjusted to anatomical and/or aesthetical features of the patient's dentition. For example, the 3D digital restoration model may be generated from scratch. For example, 3D digital artificial tooth model and/or 3D digital abutment model may be generated from scratch.

For example, a scan of natural tooth of the patient may be used as a template for the 3D digital artificial tooth model. The natural tooth being used may, e.g., be the tooth to be replaced by the preparation, a neighboring tooth of the tooth to be replaced by the preparation, or an antagonist of the tooth to be replaced by the preparation. A 3D digital tooth model of the natural tooth to be used as a template for generation the 3D digital artificial tooth model may, e.g., be generated using scan data of the patient's oral cavity. For example, one or more teeth of the patient in the oral cavity may be scanned using an intraoral scanner, e.g., an optical intraoral scanner. The scan may comprise at least a part of the dentition of the patient, which comprises the respective natural tooth. For example, the upper and/or lower jaw, i.e., the mandibular dental arch and/or maxillary dental arch, are scanned. The achieved scan data may be used to provide the 3D digital tooth model. Alternatively, an impression of one or more teeth of the patient's oral cavity, i.e., a negative imprint of the respective teeth may be taken. Either this impression may be scanned, e.g., using an optical scanner, or the negative imprint provided by the impression may be used to generate a positive reproduction of the one or more teeth of the patient, i.e., a 3D physical tooth model or cast, which is scanned, e.g., by the optical scanner to provide the scan data used to generate the 3D digital tooth model.

For example, the 3D digital tooth model may be comprised by a 3D digital teeth model of a plurality of teeth of the patient. The 3D digital teeth model may be a 3D digital model of the mandibular dental arch and/or maxillary dental arch of the patient. In order to be able to use the 3D digital tooth model as a template, the 3D digital tooth model may be segmented, i.e., extracted from the 3D digital teeth model. The 3D digital teeth model may further be provided with soft tissue, like a gingiva, in addition to the hard tissue in form of the teeth, i.e., the 3D digital teeth model may, e.g., be provided as part of a 3D digital dentition model of at least a section of the patient's oral cavity.

The position and orientation of an implant may depend on individual anatomical features of the jaw bone structure of the patient. The position and orientation of a dental restoration to be arranged at the implant on the other hand may depend on individual anatomical features of the dentition of a patient. In order to be able to retain the dental restoration at the implant using the retaining means, the dental restoration is positioned at the implant. However, due to different dependences, the orientations of the implant and the dental restoration to be fixated at the implant may not be aligned, but rather diverge. A target position and orientation of the retaining means may be defined by an anchoring section of the implant, e.g., a female thread of the implant configured for receiving a male thread of a screw used as a retaining means. The central longitudinal axis of the implant may define the target orientation of the retaining means. The female thread may, e.g., be arranged concentrically around the central longitudinal axis of the implant. A straight fastening channel extending concentrically along the central longitudinal axis of the implant may result in an disadvantages arrangement of the fastening channel within the dental restoration. For example, a mouth of the fastening channel may be arranged in a highly visible section of the dental restoration, e.g., a labial surface of a crown, which may be disadvantageous for aesthetical reasons. For example, the mouth of the fastening channel may be arranged in a section, where it is disadvantageous for functional reasons, like an incisal edge of a crown in form of an incisor. For example, the resulting arrangement of the fastening channel within the dental restoration may be disadvantageous in view of structural stability and durability of the dental restoration. For example, there may be not enough restoration material arranged around the fastening channel. For example, a required minimum thickness of restoration material adjacent to the fastening channel may be violated. The minimum thickness may define a minimum value, which is required for the thickness of the restoration material in order to ensure a suitable structural stability and/or durability of the dental restoration element. The minimum thickness may, e.g., be required to achieve an intended color and/or degree of transparency of the dental restoration element. The minimum thickness may be a restoration material specific thickness. For example, the fastening channel may be orientated in a direction, which is disadvantageous for reasons of reachability, e.g., the fastening channel may extend in oral direction. For example, due to the orientation of the fastening channel there may not be sufficient space to arrange and/or operate a fastening means for fastening the retaining means, e.g., a screw driver for fastening a screw. In orientation of the fastening channel in oral direction could, e.g., required arranging the full screw driver within the oral cavity of the patient. However, the oral cavity may not provide sufficient space for arranging the full screw driver therein.

The dental restoration may be arranged at the implant. The fastening channel comprises a first end and a second end. The first end is a connecting end providing a connection to the implant. The second end is a mouth arranged within an outer surface of the artificial tooth configured for receiving a fastening means for fastening the retaining means to retain the dental restoration on the implant. Thus, the fastening channel extends through the dental restoration to the implant and intended for the retaining means to be inserted therein, such that the retaining means can be fixated in an anchoring section of the implant. The retaining means may be a screw intended to be screwed in a female thread provided by the implant. Furthermore, the fastening channel may be configured for inserting a fastening means therein for fastening the retaining means at the implant, e.g., a screw driver used for screwing a screw into a female thread of the implant.

Based on the relative positioning of the dental restoration relative to the implant, the position of the fastening channel extending from the implant through the artificial tooth is determined. The fastening channel may, e.g., be a straight fastening channel extending concentrically along the central longitudinal axis of the implant. For example, the fastening channel may be a pre-tilted fastening channel, i.e., the fastening channel may be tilted, when assessing the fastening channel. The angulated fastening channel comprises a first straight section tilted relative to a second straight section of the fastening channel. The second straight section is a straight extension of the central longitudinal axis of the implant, i.e., the extending concentrically along the central longitudinal axis of the implant. The second straight section extends from the first end of the fastening channel, i.e., the connecting end providing the connection to the implant, to the first straight section. The first straight section of the fastening channel extends from the second straight section to the second end of the fastening channel, i.e., the mouth arranged within the outer surface of the artificial tooth of the dental restoration.

In case the position of the fastening channel within the dental restoration violates a set of one or more pre-defined positioning criteria, the position of the fastening channel is automatically adjusted by angulating the fastening channel such that the positioning criteria are satisfied. The angulating of the fastening channel comprises tilting a first straight section of the fastening channel relative to a second straight section of the fastening channel.

In case the fastening channel is a straight fastening channel, the automatically adjusting by angulating may comprise introducing an angulation, i.e., a tilt between a first and second straight section of the fastening channel. In case the fastening channel is already angulated, i.e., comprises a tilt between a first and a second straight section of the fastening channel, the automatically adjusting by angulating may comprise adjusting the angulation between the first and the second straight section of the fastening channel.

For example, a fastening channel in form of a screw channel through a screw retained dental restoration, e.g., a screw retained abutment, crown and/or bridge, is configured. The screw channel may be used for inserting a screw and a screwdriver for screwing the screw into an implant. The screw channel extends through an artificial tooth comprised by the restoration.

By screwing the screw into the implant, the restoration is fixed at the implant. Ideally, a screw channel is a straight channel, i.e., a straight extension of a central longitudinal axis of the implant extending through the artificial tooth of the restauration. However, the orientation of implants depends on multiple boundary conditions, e.g., an implant should not damage a nerve or blood vessel within the patient's jaw. Therefore, an implant may have to be inclined relative to the artificial tooth of the restauration of the restoration, e.g., in order to avoid damaging a nerve. Due to the inclination of the straight screw channel, a mouth of a straight screw channel may be located at a disadvantageous position within a surface of the artificial tooth. For example, it may be disadvantageous, if the mouth of the screw channel is located within an incisal surface of the tooth, which may later be visible. Examples may have the beneficial effect, that the screw channel is tilted. By tilting the screw channel, the mouth of the screw channel may be located within a lingual or palatal surface of the artificial tooth, which allows to keep the mouth of the screw channel out of sight.

For example, only a predefined surface or surface section of the artificial tooth is permitted to comprise the mouth of the screw channel. The location and orientation of the implant and the restoration may be given. In case the mouth of the screw channel for a straight screw channel is located outside the predefined surface or surface section, the screw channel is automatically tilted such that the mouth of the angled screw channel is located within the predefined surface or surface section, which is permitted to comprise the mouth of the screw channel. For example, the tilt angle may be determined such that a minimum thickness of tooth material at all sides around the screw channel is ensured. For example, the tilt angle may be determined such that the angle is minimized. For example, the tilt angle may be determined such that a suitable accessibility of the screw channel for the screwdriver is ensured. For example, the tilt angle may be determined such that the thickness of tooth material at all sides around the screw channel is maximized.

For example, the angulating of the fastening channel further comprises defining a first length of the second straight section being equal to a pre-defined length. Examples may have the beneficial effect, that the first length of the second straight section equals a pre-defined length. The pre-defined length may, e.g., be a generic length configured for providing a sufficient length second straight section for the fastening means to be arranged therein. For example, the pre-defined length may be equal to or larger than a length of the fastening means.

For example, the pre-defined length depends on one or more of the following: a length of a head of the retaining means; a length of the retaining means. Examples may have the beneficial effect, that the pre-defined length may provide a sufficient length of the second straight section for the fastening means to be arranged therein. The first length may, e.g., be equal to or larger than the length of the head of the fastening means. Thus, the pre-defined length may provide a sufficient length of the second straight section for the head of the fastening means to be arranged therein. The first length may, e.g., be equal to or larger than the length of the fastening means. Thus, the pre-defined length may provide a sufficient length of the second straight section for the fastening means to be arranged therein.

For example, the angulating of the fastening channel further comprises defining the first length of the second straight section being equal to or larger than a first minimum threshold, while the second length being equal to or larger than a second minimum threshold. Examples may have the beneficial effect, that the lengths of the straight sections of the fastening channel may be freely selectable or adaptable as long as the minimum values in form of the first and second minimum threshold are satisfied. Thus, it may be ensured that the second straight section has at least a length defined by the first minimum threshold and that the first straight section has at least the length defined by the second minimum threshold.

For example, the first minimum threshold depends on one or more of the following: the length of the head of the retaining means; the length of the retaining means. Examples may have the beneficial effect, that the first minimum threshold may provide a sufficient length of the second straight section for the fastening means to be arranged therein. The first length may, e.g., be equal to or larger than the length of the head of the fastening means. Thus, the first minimum threshold may provide a sufficient length of the second straight section for the head of the fastening means to be arranged therein. The first minimum threshold may, e.g., be equal to or larger than the length of the fastening means. Thus, the first minimum threshold may provide a sufficient length of the second straight section for the fastening means to be arranged therein.

For example, the first length further is defined such that furthermore one or more of the following is satisfied: the first length being equal to or smaller than a first maximum threshold; the second length being equal to or smaller than a second maximum threshold.

Examples may have the beneficial effect, that the first length of the second straight section may further be restricted based on a first maximum threshold for the first length and/or a second maximum threshold for the second length of the first straight section. Restricting the choice of the first length by a first maximum threshold may ensure that the first length is not larger than the first maximum threshold. Furthermore, the choice of the first length may be restricted indirectly such that the second length is not larger than the second maximum. The shorter the second straight section is, i.e., the smaller the first length is, the larger is the first straight section, i.e., the second length.

For example, the angulating of the fastening channel further comprises rotating the fastening channel around the central longitudinal axis of the implant. Examples may have the beneficial effect, that by a rotation of the fastening channel around the central longitudinal axis of the implant the position of the mouth within the outer surface of the artificial tooth may be adjusted. By rotating the fastening channel around the central longitudinal axis, the first straight section with the second end of the fastening channel, i.e., the mouth, is rotated around the central longitudinal axis. Thus, the mouth within the outer surface of the artificial tooth may be adjusted in a direction perpendicular to the central longitudinal axis. By tilting the first straight section relative to the second straight section of the fastening channel, the mouth within the outer surface of the artificial tooth may be adjusted in a direction parallel to the central longitudinal axis. In combination, the aforementioned rotating and tilting may enable an adjustment of the mouth of the fastening channel throughout the outer surface of the artificial tooth.

For example, the fastening channel for which the position is determined is a straight channel with the position of the fastening channel being defined as a straight extension of a central longitudinal axis of the implant extending through the dental restauration with the artificial tooth. The straight fastening channel may extend concentrically along the central longitudinal axis of the implant. Thus, for the adjusting of the position of the fastening channel an angulation of the fastening channel may be introduced.

For example, the fastening channel for which the position is determined is a pre-tilted fastening channel with the first straight section being pre-tilted relative to the second straight section. Thus, for the adjusting of the position of the fastening channel the tilt of the fastening channel may be adjusted.

For example, the method further comprises receiving a user input defining the pre-tilted fastening channel. Examples may have the beneficial effect, that the pre-tilted fastening channel may be defined by a user input.

For example, the method further comprises dynamically displaying the automatically adjusting of the position of the fastening channel. Examples may have the beneficial effect, that the automatically adjusting of the position of the fastening channel may be displayed, e.g., on a graphical user interface on a display. The output on the display may, e.g., comprise a visual representation of the dental restoration, the dynamically adjusted fastening channel and the implant. For example, the automatically adjusting of the position of the fastening channel may be displayed in real time. Thus, adjustments of the position of the fastening channel may be provided on-the-fly, e.g., while adjusting position, orientation and/or form of the dental restoration and/or the implant.

For example, the method further comprises re-positioning the dental restoration relative to the implant, while maintaining the position of the fastening channel relative to the implant. The position of the fastening channel relative to the re-positioned dental restoration is determined. In case the position of the fastening channel extends through the re-positioned dental restoration with the artificial tooth violating the set of one or more pre-defined positioning criteria, the angulation of the fastening channel is automatically adjusted such that the positioning criteria are satisfied.

Examples may have the beneficial effect, that the angulation of the fastening channel is automatically adjusted to a re-positioning of the dental restoration. The re-positioning of the dental restoration may comprise an adjusting of the position and/or the orientation of the dental restoration. By re-positioning the dental restoration relative to the implant, while maintaining the position of the fastening channel relative to the implant, a position of the fastening channel relative to the dental restoration may be modified. This modification may result in a disadvantageous position of the fastening channel within the artificial tooth violating one or more pre-defined positioning criteria. By the automatically adjusting of the angulation of the fastening channel, the position of the fastening channel within the artificial tooth may be adjusted such that the positioning criteria are satisfied.

The re-positioning of the dental restoration may be based on a user input, e.g., provided via a graphical user interface displayed on a display. The automatic adjustment of the angulation of the fastening channel may be displayed dynamically in response to a dynamic re-positioning of the dental restoration. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while re-positioning the dental restoration.

For example, the re-positioning of the dental restoration relative to the implant is dynamically displayed. For example, the automatically adjusting of the angulation of the fastening channel is dynamically displayed simultaneously with the dynamically displaying of the re-positioning of the dental restoration relative to the implant.

For example, the adjusting of the angulation of the fastening channel to satisfy the set of one or more pre-defined positioning criteria for the re-positioned dental restoration comprises one or more of the following: adjusting the tilting of the first straight section relative to the second straight section; adjusting the first length of the second straight section; rotating the fastening channel around the central longitudinal axis of the implant.

Examples may have the beneficial effect, that an effective adjusting of the angulation of the fastening channel may be implemented. In particular, the position of the mouth of the fastening channel within the outer surface of the artificial tooth may thereby be adjustable.

Any position of the of the mouth of the fastening channel within the outer surface of the artificial tooth may be reachable. By adjusting the tilting of the first straight section relative to the second straight section, the position of the mouth of the fastening channel within the outer surface of the artificial tooth may be adjusted in a direction parallel to the central longitudinal axis of the implant. In this case, the adjustment does not require an adjusting of the first length of the second straight section. By adjusting the first length of the second straight section, the position of the mouth of the fastening channel within the outer surface of the artificial tooth may be adjusted in the direction parallel to the central longitudinal axis of the implant. In this case, the adjustment does not require an adjusting of the tilting. By rotating the fastening channel around the central longitudinal axis of the implant, the mouth of the fastening channel within the outer surface of the artificial tooth may be adjusted in a direction perpendicular to the central longitudinal axis of the implant. The mouth is thereby moveable within the outer surface of the artificial tooth on a circumferential path around the artificial tooth. The circumferential path is defined by an intersection of a plane perpendicular to the central longitudinal axis of the implant and the outer surface of the artificial tooth.

For example, the method further comprises amending the dental restoration. The amending of the dental restoration comprises amending the shape of the artificial tooth of the dental restoration, while maintaining the position of the fastening channel relative to the implant. The position of the fastening channel relative to the amended dental restoration is determined. In case the position of the fastening channel extending through the amended artificial tooth violates the set of one or more pre-defined positioning criteria, the angulation of the fastening channel is automatically adjusted such that the positioning criteria are satisfied.

Examples may have the beneficial effect, that the angulation of the fastening channel is automatically adjusted to an amendment of the shape of the dental restoration. By amending the shape, i.e., the 3D geometrical form, of the dental restoration relative, the position of the mouth of the fastening channel within the outer surface of the artificial tooth may be modified. Furthermore, the position of the fastening channel within the artificial tooth and in particular the amount of restoration material of the dental restoration surrounding the fastening channel may be modified. These modifications may result in a disadvantageous position of the fastening channel within the artificial tooth violating one or more pre-defined positioning criteria. By the automatically adjusting of the angulation of the fastening channel, the position of the fastening channel within the artificial tooth may be adjusted such that the positioning criteria are satisfied.

The amending the shape of the artificial tooth of the dental restoration may be based on a user input, e.g., provided via a graphical user interface displayed on a display. The automatic adjustment of the angulation of the fastening channel may be displayed dynamically in response to a dynamic re-positioning of the dental restoration. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while amending the shape of the artificial tooth.

For example, the amending of the dental restoration is dynamically displayed. For example, the automatically adjusting of the angulation of the fastening channel is dynamically displayed simultaneously with the dynamically displaying of the amending the dental restoration.

For example, the adjusting of the angulation of the fastening channel to satisfy the set of one or more pre-defined positioning criteria for the amended dental restoration comprises one or more of the following: adjusting the tilting of the first straight section relative to the second straight section; adjusting the first length of the second straight section; rotating the fastening channel around the central longitudinal axis of the implant.

Examples may have the beneficial effect, that an effective adjusting of the angulation of the fastening channel may be implemented. In particular, the position of the mouth of the fastening channel within the outer surface of the artificial tooth may thereby be adjustable. Any position of the of the mouth of the fastening channel within the outer surface of the artificial tooth may be reachable. By adjusting the tilting of the first straight section relative to the second straight section, the position of the mouth of the fastening channel within the outer surface of the artificial tooth may be adjusted in a direction parallel to the central longitudinal axis of the implant. In this case, the adjustment does not require an adjusting of the first length of the second straight section. By adjusting the first length of the second straight section, the position of the mouth of the fastening channel within the outer surface of the artificial tooth may be adjusted in the direction parallel to the central longitudinal axis of the implant. In this case, the adjustment does not require an adjusting of the tilting. By rotating the fastening channel around the central longitudinal axis of the implant, the mouth of the fastening channel within the outer surface of the artificial tooth may be adjusted in a direction perpendicular to the central longitudinal axis of the implant. The mouth is thereby moveable within the outer surface of the artificial tooth on a circumferential path around the artificial tooth. The circumferential path is defined by an intersection of a plane perpendicular to the central longitudinal axis of the implant and the outer surface of the artificial tooth.

For example, the method further comprises re-positioning the implant relative to the dental restoration, while maintaining the position of the fastening channel relative to the implant. The position of the re-positioned fastening channel relative to the dental restoration is determined. In case the position of the re-positioned fastening channel extending through the artificial tooth violates the set of one or more pre-defined positioning criteria, the angulation of the fastening channel is automatically adjusted such that the positioning criteria are satisfied.

Examples may have the beneficial effect, that the angulation of the fastening channel is automatically adjusted to a re-positioning of the implant. The re-positioning of the implant may comprise an adjusting of the position and/or the orientation of the implant. By re-positioning the implant relative to the dental restoration, while maintaining the position of the fastening channel relative to the implant, a position of the fastening channel relative to the dental restoration may be modified. This modification may result in a disadvantageous position of the fastening channel within the artificial tooth violating one or more pre-defined positioning criteria. By the automatically adjusting of the angulation of the fastening channel, the position of the fastening channel within the artificial tooth may be adjusted such that the positioning criteria are satisfied.

The re-positioning of the implant may be based on a user input, e.g., provided via a graphical user interface displayed on a display. The automatic adjustment of the angulation of the fastening channel may be displayed dynamically in response to a dynamic re-positioning of the implant. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while re-positioning the implant.

For example, the re-positioning of the implant relative to the dental restoration is dynamically displayed. For example, the automatically adjusting of the angulation of the fastening channel is dynamically displayed simultaneously with the dynamically displaying of the re-positioning the implant relative to the dental restoration.

For example, the adjusting of the angulation of the fastening channel to satisfy the set of one or more pre-defined positioning criteria for the re-positioned implant comprises one or more of the following: adjusting the tilting of the first straight section relative to the second straight section; adjusting the first length of the second straight section; rotating the fastening channel around the central longitudinal axis of the implant.

Examples may have the beneficial effect, that an effective adjusting of the angulation of the fastening channel may be implemented. In particular, the position of the mouth of the fastening channel within the outer surface of the artificial tooth may thereby be adjustable. Any position of the of the mouth of the fastening channel within the outer surface of the artificial tooth may be reachable. By adjusting the tilting of the first straight section relative to the second straight section, the position of the mouth of the fastening channel within the outer surface of the artificial tooth may be adjusted in a direction parallel to the central longitudinal axis of the implant. In this case, the adjustment does not require an adjusting of the first length of the second straight section. By adjusting the first length of the second straight section, the position of the mouth of the fastening channel within the outer surface of the artificial tooth may be adjusted in the direction parallel to the central longitudinal axis of the implant. In this case, the adjustment does not require an adjusting of the tilting. By rotating the fastening channel around the central longitudinal axis of the implant, the mouth of the fastening channel within the outer surface of the artificial tooth may be adjusted in a direction perpendicular to the central longitudinal axis of the implant. The mouth is thereby moveable within the outer surface of the artificial tooth on a circumferential path around the artificial tooth. The circumferential path is defined by an intersection of a plane perpendicular to the central longitudinal axis of the implant and the outer surface of the artificial tooth.

For example, the method further comprises receiving a 3D digital dentition model of at least a part of a dentition of a patient. The definition of the implant defines a position of the implant within the 3D digital dentition model. The 3D digital dentition model may, e.g., comprise a 3D digital jaw model of a bone structure of a jaw of the patients, in which the implant is arranged. Examples may have the beneficial effect, that the position of the implant within the 3D digital dentition model may be displayed and adjusted, e.g., based on a user input.

For example, the relative positioning of the dental restoration relative to the implant is determined using the 3D digital dentition model. The 3D digital dentition model may, e.g., comprise a 3D digital of the teeth of the patient. Thus, using the 3D digital dentition model a position and orientation of the dental restoration with in the patient's dentition, e.g., relative to neighboring teeth and/or an antagonist may be determined and adjusted, if necessary.

For example, the 3D digital dentition model comprises at least part of one of the following: a mandibular dental arch, a mandibular bone, a maxillary dental arch, a maxillary bone. For example, the 3D digital dentition model may comprise a mandibular dental arch and a mandibular bone of the patient. For example, the 3D digital dentition model may comprise a maxillary dental arch and a maxillary bone of the patient. For example, the 3D digital dentition model may comprise a mandibular dental arch and a mandibular bone as well as a maxillary dental arch and a maxillary bone of the patient.

For example, the definition of the implant comprises a 3D digital implant model of the implant. Examples may have the beneficial effect, that the full implant may be visualized in form of 3D digital implant model.

For example, the positioning criteria comprises one or more of the following: a material thickness of a material of the artificial tooth extending radially at all sides around the fastening channel being exceeding a pre-defined material depending minimum thickness; the material thickness of the material of the artificial tooth extending radially at all sides around the fastening channel being maximized, while the mouth of the fastening channel being located within a first section of the outer surface of the artificial tooth; the mouth of the fastening channel being located within a second section of the outer surface of the artificial tooth, the second section being assigned as sufficiently restricting a visibility of the mouth from outside an oral cavity of the patient; the mouth of the fastening channel being located within a third section of the outer surface of the artificial tooth, the third section assigned as being accessible for a fastening means; the first straight section of the fastening channel pointing towards a center of the oral cavity of the patient.

Requiring that a material thickness of a material of the artificial tooth extending radially at all sides around the fastening channel exceeds a pre-defined material depending minimum thickness may ensure, that due to the fastening channel no undercutting of the respective minimum thickness is cause. The minimum thickness may define a minimum value, which is required for the thickness of the restoration material in order to ensure a suitable structural stability and/or durability of the dental restoration element. The minimum thickness may, e.g., be required to achieve an intended color and/or degree of transparency of the dental restoration element. The minimum thickness may be a restoration material specific thickness.

By maximizing the material thickness of the material of the artificial tooth extending radially at all sides around the fastening channel being maximized, a structural durability and stability of the dental restoration may be ensured at all sides of the fastening channel. Furthermore, with the mouth of the fastening channel being located within a first section of the outer surface of the artificial tooth, it may in addition be ensured that the mouth of the fastening channel is not located within any disadvantageous sections of the outer surface of the artificial tooth.

Requiring that the mouth of the fastening channel is located within a second section of the outer surface of the artificial tooth, which is assigned as sufficiently restricting a visibility of the mouth from outside an oral cavity of the patient, may ensure a sufficient restriction of visibility of the mouth. The second section may, e.g., be a lingual or palatal section of the outer surface of the artificial tooth, which is out of sight or sufficiently out of sight from the outside of the oral cavity of the patient.

Requiring that the mouth of the fastening channel is located within a third section of the outer surface of the artificial tooth, which is assigned as being accessible for a fastening means, may ensure accessibility of the mouth of the fastening channel. Thus, the it may be ensured that the fastening means, e.g., a screw driver for fastening a screw, can be inserted into the fastening channel and operated therein for fastening the retaining means.

Requiring that the first straight section of the fastening channel pointing towards a center of the oral cavity of the patient may as well ensure accessibility of the mouth of the fastening channel. It may further ensure a facilitated operation of the fastening means, e.g., a screw driver for fastening a screw, in order to fastening the retaining means in the fastening channel.

For example, the method further comprises determining the second section of the outer surface of the artificial tooth using the 3D digital dentition model. For example, the second section may be determined by a user input. Examples may have the beneficial effect, that the 3D digital dentition model may be used to define and/or test the second section. For example, the second section may be defined, e.g., as lingual or palatal section of the outer surface of the artificial tooth and it may be tested, whether or to which degree a mouth of a fastening channel arranged therein is visible from the outside of the oral cavity of the patient.

For example, the method further comprises determining the third section of the outer surface of the artificial tooth using the 3D digital dentition model. For example, the third section may be determined by a user input. Examples may have the beneficial effect, that the 3D digital dentition model may be used to define and/or test the third section. For example, the third section may be defined and it may be tested, whether or to which degree a mouth of a fastening channel arranged therein is accessible by a fastening means, e.g., a screw driver for fastening a screw.

For example, the method further comprises using the 3D digital dentition model to determine, whether the first straight section of the fastening channel is pointing towards the center of the oral cavity of the patient. Using the 3D digital dentition model the center of the oral cavity of the patient may be defined and for any position and/or orientation of the first straight section of the fastening channel it may be tested, whether the first straight section points towards the center of the oral cavity. For example, it may be tested, whether a central longitudinal axis of the first straight section intersects the center of the oral cavity. The center may be a center point or a center region, e.g., a two-dimensional or three-dimensional region of space arranged at the center of the oral cavity of the patient.

For example, the first section of the outer surface of the artificial tooth is comprised by one of the following: a lingual surface, in case the artificial tooth being a mandibular incisor; a palatal surface, in case the artificial tooth being a maxillary incisor; an occlusal surface, in case the artificial tooth being a molar.

For example, the second section of the outer surface of the artificial tooth is comprised by one of the following: a lingual surface, in case the artificial tooth being a mandibular incisor; a palatal surface, in case the artificial tooth being a maxillary incisor; an occlusal surface, in case the artificial tooth being a molar.

For example, the second section of the outer surface of the artificial tooth is comprised by one of the following: a lingual surface, in case the artificial tooth being a mandibular incisor; a palatal surface, in case the artificial tooth being a maxillary incisor; an occlusal surface, in case the artificial tooth being a molar.

For example, the first section is identical with at least one of the following: the second section, the third section.

For example, the set of criteria comprises a plurality of positioning criteria, the positioning criteria of the plurality of positioning criteria being weighted relative to each other using weight factors being assigned to the individual positioning criteria. Examples may have the beneficial effect, that a combination of a plurality of positioning criteria may be taken into account.

For example, the method further comprises determining a tilt angle of the tilting of the first straight section relative to the second straight section such that a resulting total tilt angle of the first straight section relative to the second straight section is equal to or smaller than a third maximum threshold. The tilt angle may be defined as the angle α position of the first straight section, in which the first straight section extends concentrically along the central longitudinal axis of the implant, and the tilted position of the first straight section. Examples may have the beneficial effect, that it may be ensured that the tilt angle does not exceed the third maximum threshold. Thus, a limit for the tilting may be provided. A smaller tilt angle may, e.g., facilitate an arranging of the retaining means at a pre-defined position at the implant via the fastening channel. Furthermore, a smaller tilt angle may, e.g., facilitate an operation of the fastening means, e.g., a screw driver, within the fastening channel for fastening the retaining means, e.g., a screw.

For example, the tilt angle of the tilting of the first straight section relative to the second straight section being determined such that a resulting total tilt angle of the first straight section relative to the second straight section is minimized. Examples may have the beneficial effect, that a smaller tilt angle may, e.g., facilitate an arranging of the retaining means at a pre-defined position at the implant via the fastening channel. Furthermore, a smaller tilt angle may, e.g., facilitate an operation of the fastening means, e.g., a screw driver, within the fastening channel for fastening the retaining means, e.g., a screw.

For example, the method further comprises using the 3D digital dentition model for determining the tilt angle of the tilting of the first straight section relative to the second straight section such that the mouth of the fastening channel being located in direction along the dental arch of the patient in a middle of the artificial tooth. Depending on a rotational orientation of the tilting of the first straight section relative to the central longitudinal axis of the implant, the mouth of the fastening channel may be located in direction along the dental arch of the patient in a middle of the artificial tooth or the location of the mouth may deviate from a position in the middle. For example, by rotating the fastening channel around the central longitudinal axis of the implant, the orientation may be adjusted. The adjustment may result in a locating of the mouth of the fastening channel in the middle of the artificial tooth in direction along the dental arch of the patient.

For example, the method further comprises using a trained machine learning module for automatically adjusting the position of the fastening channel. The trained machine learning module is configured to provide an adjusted position of the fastening channel within the artificial tooth as an output in response to receiving the 3D digital restoration model of the dental restoration and a definition of a fastening channel as input.

Examples may have the beneficial effect, that the trained machine learning module may be used for automatically adjusting the position of the fastening channel. The adjusted position of the fastening channel within the artificial tooth is provided as output by the trained machine learning module in response to receiving the 3D digital restoration model of the dental restoration and a definition of a fastening channel as input. For example, the input may further comprise an identifier identifying a required minimum thickness of the restoration material to be used to manufacture the artificial tooth of the dental restoration.

For example, the method further comprises providing the trained machine learning module. The providing of the trained machine learning module comprises receiving a machine learning module to be trained. A set of training datasets for training the machine learning module to be trained is received. Each training dataset comprises a 3D digital training restoration model of a training dental restoration and a definition of a training fastening channel as well as a definition of an adjusted position of the training fastening channel satisfying the set of one or more positioning criteria. The machine learning module to be trained is trained to provide the definitions of the adjusted positions of the training fastening channels of the training datasets as an output in response to receiving the 3D digital training restoration models and the definitions of the training fastening channels of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

Examples may have the beneficial effect, that by training the machine learning module to be trained, the machine learning module may be configured to provide the adjusted position of the fastening channel within the artificial tooth as output in response to receiving the 3D digital restoration model of the dental restoration and a definition of a fastening channel as input. In order to achieve this goal, a set, i.e., a plurality, of suitable training datasets may be provided. Each of the training datasets may comprise a 3D digital training restoration model of a training dental restoration and a definition of a training fastening channel as well as a definition of an adjusted position of the training fastening channel satisfying the set of one or more positioning criteria.

For example, the training datasets may furthermore comprise training identifier identifying a required minimum thickness of the restoration material to be used to manufacture the artificial tooth of the dental restoration. Thus, the machine learning module to be trained may further be trained to take into account a minimum thickness of the restoration material for angulating the fastening channel such that the positioning criteria are satisfied.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., an adjusted position of a fastening channel within the artificial tooth as output by the trained machine learning module. The trained machine learning module may predict the unmeasured value from other, known values, e.g., a 3D digital restoration model of a dental restoration comprising the artificial tooth and a definition of the fastening channel as input. For example, an identifier may be provided as additional input identifying a required minimum thickness of the restoration material to be used to manufacture the artificial tooth of the dental restoration.

For example, the method further comprises indicating an area of the outer surface of the artificial tooth with the position of the fastening channel satisfying the set of one or more pre-defined positioning criteria, when the mouth of the fastening channel being located within the indicated area. Examples may have the beneficial effect, that a user may be enable to adjust the mouth of the fastening channel within the indicated area without violating the one or more pre-defined positioning criteria. The area may be indicated in a visual representation of the dental restoration provided on a graphical user interface displayed on a display. The visual representation may further comprise fastening channel and the implant.

For example, the artificial tooth of the dental restoration retained by the retaining means is a crown. For example, the artificial tooth of the dental restoration retained by the retaining means is part of a bridge. For example, the dental restoration retained by the retaining means comprises an abutment.

For example, the retaining means comprises a screw. For example, a fastening means for fastening the screw may be a screw driver.

For example, the method further comprises manufacturing the dental restoration using the 3D digital restoration model as template. The manufactured dental restoration is a physical copy of the respective template. For example, the artificial tooth of the restoration element is manufactured using the 3D digital restoration model as template.

Examples may have the beneficial effect, that a physical dental restoration may be provided. The physical dental restoration, e.g., a crown or bridge, may be configured to be retained at an implant using a retaining means, e.g., a screw.

For example, the restoration element is manufactured using one of the following: machining, 3D printing, casting. For example, the artificial tooth of the restoration element is manufactured using one of the following: machining, 3D printing, casting.

Examples may have the beneficial effect, that the dental restoration may be manufactured using a machining device configured to manufacture the dental restoration, e.g., a crown or bridge, by processing a blank of restoration material. The resulting dental restoration may be configured to be retained at an implant using a retaining means, e.g., a screw. For example, the dental restoration may be manufactured using a 3D printing device, i.e., a printer, configured to print the dental restoration element. The resulting dental restoration, e.g., a crown or bridge, may be configured to be retained at an implant using a retaining means, e.g., a screw.

For example, the 3D digital restoration model may be used as a positive to define a negative of the physical dental restoration in form of a negative 3D digital restoration model. The negative 3D digital restoration model may be used to manufacture, e.g., using machining or 3D printing, a casting matrix. The casting matrix may be configured for casting the physical dental restoration by inserting restoration material into the casting matrix and curing the inserted restoration material. The resulting dental restoration, e.g., a crown or bridge, may be configured to be retained at an implant using a retaining means, e.g., a screw.

The dental restoration manufactured comprises the fastening channel. The fastening channel may, e.g., be implemented during manufacturing of the dental restoration using one of the following: machining, 3D printing, casting. For example, the fastening channel may be implemented after the dental restoration has been manufactured using machining, e.g., drilling and/or milling. The restoration material used for manufacturing the dental restoration may, e.g., be a restoration material requiring a hardening, e.g., sintering. For example, the fastening channel may be implemented before hardening the dental restoration.

In case the restoration material is a restoration material requiring a hardening, e.g., sintering, the 3D digital restoration model may be scaled up and the scaled-up version of the 3D digital restoration model may be used as a template for manufacturing the dental restoration. The 3D digital restoration model may be scaled up using a scaling factor, which is an inverse of a shrinking factor quantifying a shrinking of the dental restoration due to the hardening, e.g., sintering. Thus, by scaling up the 3D digital restoration model the shrinking of the dental restoration due to the hardening, e.g., sintering, may be compensated.

Examples may enable an automatic angulating of a fastening channel extending through a dental restoration. For example, a patient's jaws may be scanned. Furthermore, DICOM Data may, e.g., be received indication, where the nerves are located within the patient's jaws. A location for the dental restoration may be chosen. The 3D digital restoration model defining the dental restoration may be received or generated using CAD. An implant, i.e., a 3D digital implant model, may be positioned in the jaw, i.e., a 3D digital jaw model of the patient's jaw. For positioning the implant, e.g., the following may be used: the location chosen for the dental restoration with the dental restoration as a reference and/or the DICOM data, if available. In the same step, e.g., the implant may be arranged at the dental restoration. A 3D digital visualization of a fastening channel may be generated, e.g., in form of a straight cylinder, which extends concentrically along a central longitudinal axis. Depending on implant and/or the retaining means, e.g., screw, to be used in combination with the dental restoration, a radius of the fastening channel may, e.g., be determined. It may, e.g., be recognizing automatically, if a mouth of the fastening channel is located at an unsuitable side of an artificial tooth of the dental restoration. For example, the artificial tooth is a library tooth selected from a tooth library. The artificial tooth provided by the tooth library may be assigned with identifier identifying locations of all sides of each 3D digital artificial tooth model provided. Thus, it may be determined using the identifier, e.g., which side is the lingual side and which side is the vestibular side of the artificial tooth defined by the 3D digital artificial tooth model. Thus, a cross-examining using the position of the mouth of the fastening channel and the side information provided by the identifiers assigned to the 3D digital artificial tooth model, it may be determined at which side of the artificial tooth, the mouth is actually located.

If the mouth of the fastening channel is located at an unsuitable side of an artificial tooth of the dental restoration, e.g., a decision may be made to angulate the fastening channel to a suitable side of the artificial tooth. The respective side may, e.g., be suitable for aesthetical reasons. Aesthetically suitable sides may, e.g., be a lingual side for lower incisor, a palatal side for an upper incisor and/or an occlusal side for a molar.

For calculating an angle for the angulation, i.e., a tilt angle, one or more of the following variables may, e.g., be used: a height of a screw head of a screw used as retaining means may be a fixed variable; a radius of the fastening channel may be a fixed variable; the tilt angle may have a value within the range from 0° to 90°; a minimum thickness of restoration material at all sides around the fastening channel in the dental restoration may be required; a smallest possible angulation required in respect to the minimum thickness from all sides may be selected; distance creating elements, like a Ti-base, etc., may be taken into account; at the mouth, the fastening channel may be required to point into a direction of a center of the oral cavity of the patient; a thickness of restoration material of the dental restoration may be required to be maximized at all sides around fastening channel.

The angulation may, e.g., be adjusting to be as small as possible with regard to the implant access and/or to fulfill the minimum thickness at all sides around the fastening channel. The result of the angulation may, e.g., be implemented in the 3D digital visualization of the dental restoration. One or more areas of the artificial tooth within which a location of the mouth of the angulated satisfies all criteria selected from the aforementioned criteria for assessing the fastening channel, may be highlighted. In case the dental restoration and/or the implant are repositioned, the position and size of the highlighted areas may be adapted dynamically.

For example, the user may choose an angulation of the fastening channel, e.g., by selecting a position of the mouth of the fastening channel within the highlighted area. For example, an angulation may automatically be chosen, for which the tilt angle is minimized. For example, material may be automatically added to the artificial tooth defined by the 3D digital artificial tooth model, in case the tilt angle is chosen, but the minimum thickness is not achieved at all sides around the fastening channel. It may, e.g., further be checked, whether an angle of holding a screw driver resulting from the tilt angle may result in difficulties to use the screw driver. In case difficulties are determined, such difficulties may be indicated automatically, e.g., as awarding. Such difficulties may be assessed taking into account the individual anatomical features of a patient's oral cavity. In particular, a size of the oral cavity, a geometrical form of the oral cavity and/or the location of the dental restoration within the oral cavity. For example, a smaller tilt angle may be better for fitting retaining means, like a screw, into the fastening channel and/or fastening the retaining means within the fastening channel.

In another aspect, the invention relates to a computer program product for configuring a fastening channel through a dental restoration for fastening a retaining means retaining the dental restoration. The computer program product comprises a computer readable storage medium having program instructions embodied therewith. The program instructions are executable by a processor of a computer device to cause the computer device to receive a 3D digital restoration model of the dental restoration. The dental restoration comprises an artificial tooth. A definition of an implant is received configured to receive the retaining means to retain the dental restoration on the implant. The definition of the implant comprises a central longitudinal axis of the implant. A relative positioning of the dental restoration relative to the implant is determined. A position of the fastening channel extending from the implant through the artificial tooth is determined. The fastening channel comprises a first end and a second end. The first end is a connecting end providing a connection to the implant. The second end is a mouth within an outer surface of the artificial tooth configured for receiving a fastening means for fastening the retaining means to retain the dental restoration on the implant.

In case the position of the fastening channel violates a set of one or more pre-defined positioning criteria, the position of the fastening channel is automatically adjusted by angulating the fastening channel such that the positioning criteria are satisfied. The angulating of the fastening channel comprises tilting a first straight section of the fastening channel relative to a second straight section of the fastening channel. The second straight section is a straight extension of the central longitudinal axis of the implant extending from the first end of the fastening channel to the first straight section. The first straight section extends from the second straight section to the second end of the fastening channel.

The program instructions provided by the computer program product may be configured for causing the computer device to execute any of the aforementioned methods for configuring a fastening channel through a dental restoration for fastening a retaining means retaining the dental restoration.

In another aspect, the invention relates to a computer device for configuring a fastening channel through a dental restoration for fastening a retaining means retaining the dental restoration. The computer device comprises a processor and a memory storing program instructions executable by the processor. Execution of the program instructions by the processor causes the computer device to receive a 3D digital restoration model of the dental restoration. The dental restoration comprises an artificial tooth. A definition of an implant is received configured to receive the retaining means to retain the dental restoration on the implant. The definition of the implant comprises a central longitudinal axis of the implant. A relative positioning of the dental restoration relative to the implant is determined. A position of the fastening channel extending from the implant through the artificial tooth is determined. The fastening channel comprises a first end and a second end. The first end is a connecting end providing a connection to the implant. The second end is a mouth within an outer surface of the artificial tooth configured for receiving a fastening means for fastening the retaining means to retain the dental restoration on the implant.

In case the position of the fastening channel violates a set of one or more pre-defined positioning criteria, the position of the fastening channel is automatically adjusted by angulating the fastening channel such that the positioning criteria are satisfied. The angulating of the fastening channel comprises tilting a first straight section of the fastening channel relative to a second straight section of the fastening channel. The second straight section is a straight extension of the central longitudinal axis of the implant extending from the first end of the fastening channel to the first straight section. The first straight section extends from the second straight section to the second end of the fastening channel.

The computer device may be configured for executing any of the aforementioned methods for configuring a fastening channel through a dental restoration for fastening a retaining means retaining the dental restoration.

In another aspect, the invention relates to a manufacturing system comprising the computer device for configuring a fastening channel through a dental restoration for fastening a retaining means retaining the dental restoration. The manufacturing system further comprises one or more manufacturing devices configured to manufacture the dental restoration with the fastening channel. Execution of the program instructions by the processor further causes the computer device to control the one or more manufacturing devices to manufacture the dental restoration using the 3D digital restoration model as template. The manufactured dental restoration is a physical copy of the respective template.

The manufacturing system may be configured for manufacturing any of the aforementioned examples of a dental restoration with a fastening channel for fastening a retaining means retaining the dental restoration.

For example, the one or more manufacturing devices are one or more of the following: one or more machining devices, one or more 3D printing devices.

The above-described examples and embodiments may be combined freely as long as the combinations are not mutually exclusive.

In the following, embodiments of the invention are described in greater detail in which FIG. 1 shows exemplary a dental restoration, an implant and retaining means;

In the following similar features are denoted by the same reference numerals.

Figure 1:
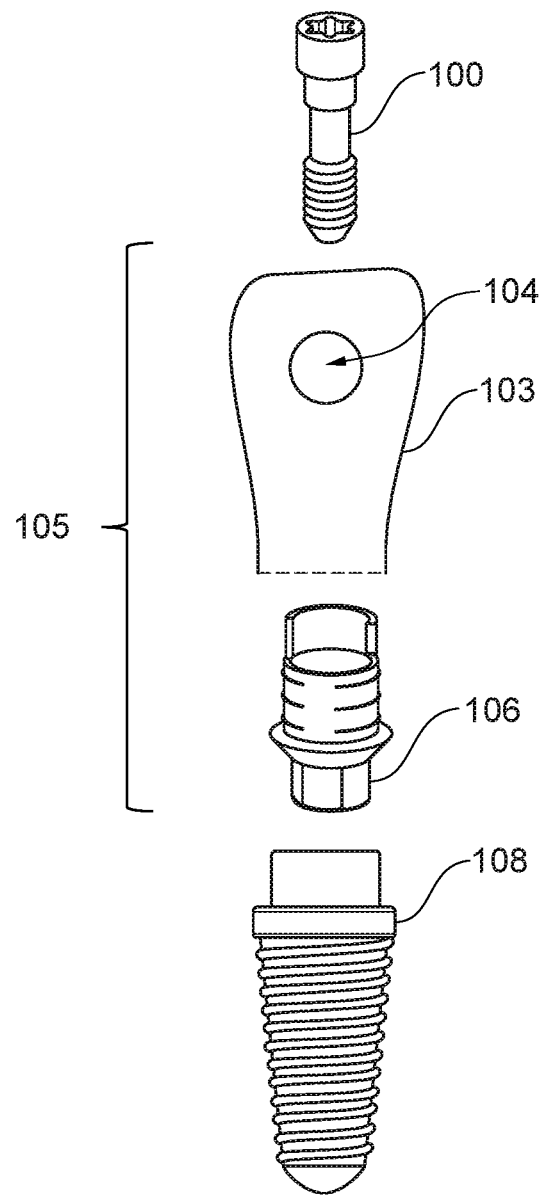

FIG. 1 shows exemplary a dental restoration 105. The dental restoration 105 comprises an artificial tooth 103. In case of FIG. 1 the artificial tooth 103 is provided in form of a crown. The crown 102 is configured to be arranged on an abutment 106. The dental restoration 105 is configured to be anchored using an implant 108, at which the dental restoration 105 is retained. For retaining the dental restoration 105 at the implant 108, retaining means 100, e.g., a screw, are used. The crew 100 is inserted into a mouth 104 of a fastening channel. The fastening channel connects the mouth 104 with the implant 108, when the dental restoration 105 is arranged on the implant. The screw 100 is screwed into a female thread of the implant 108. The female thread of the implant 108 for receiving a male thread of the screw 100 may extend concentrically along a central longitudinal axis of the implant 108. The crown 103 may, e.g., be an incisor. The mouth 104 of the fastening channel may, e.g., be arranged within a lingual or palatal section of an outer surface of the crown 103. After the screw 100 has been screwed into the female thread of the implant 108 for retaining the dental restoration 105 at the implant 108. The fastening channel with the mouth 104 may be filled up with a restoration material. However, even the filled-up mouth 104 may still be visible or at least lightly visible. Therefore, by arranging the mouth 104 within a lingual or palatal section of an outer surface of the crown 103, it may be ensured that the mouth 104 remains invisible form the outside of the oral cavity of the patient, e.g., when the patient is smiling.

Figure 2:
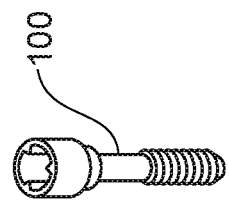
FIG. 2 shows exemplary fastening means, an abutment and retaining means.
Figure 2:
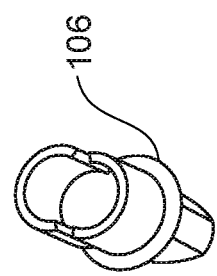
Figure 2:
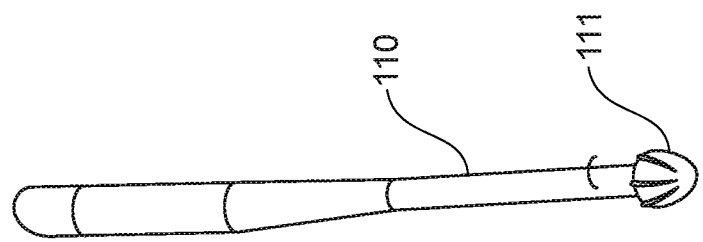

FIG. 2 shows exemplary fastening means 110 in form of a screw driver. A screwing end 111 of the screw driver 110 may be configured to engage the retaining means 100 in form of a screw. The screwing end 111 is ball shaped in order to enable a screwing of the screw 100 under different tilt angles due to a tilt angle of the fastening channel, via which the screw 100 is fastened using the screw driver 110. The screw 100 may be arranged within an abutment 110 for being fastened to an implant. The abutment may provide support and stability to a crown being arranged thereon.

Figure 3:
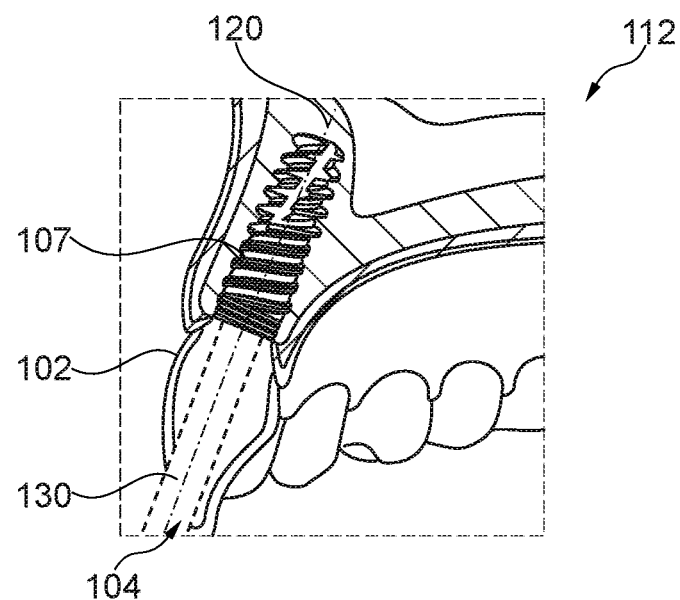
FIG. 3 shows a cross-sectional view of an exemplary 3D digital restoration model with a straight fastening channel.

FIG. 3 shows a cross-sectional view of an exemplary 3D digital restoration model in form of a 3D digital artificial tooth model 102. The 3D digital artificial tooth model 102 is arranged on a 3D digital implant model 107. The 3D digital artificial tooth model 102 and 3D digital implant model 107 are arranged within a 3D digital dentition model 112 of the patient.

The 3D digital artificial tooth model 102 may, e.g., be a library tooth and provided by selecting the 3D digital artificial tooth model 102 from a set of 3D digital artificial tooth models of library teeth. For example, 3D digital artificial tooth model 102 may be generated from scratch. For example, a scan of natural tooth of the patient may be used as a template for the 3D digital artificial tooth model 102. The natural tooth being used may, e.g., be the tooth to be replaced by the preparation, a neighboring tooth of the tooth to be replaced by the preparation, or an antagonist of the tooth to be replaced by the preparation. A 3D digital tooth model of the natural tooth to be used as a template for generation the 3D digital artificial tooth model 102 may, e.g., be generated using scan data of the patient's oral cavity.

For example, one or more teeth of the patient in the oral cavity may be scanned using an intraoral scanner, e.g., an optical intraoral scanner. The scan may comprise at least a part of the dentition of the patient, which comprises the respective natural tooth. For example, the upper and/or lower jaw, i.e., the mandibular dental arch and/or maxillary dental arch, are scanned. The achieved scan data may be used to provide the 3D digital tooth model. Alternatively, an impression of one or more teeth of the patient's oral cavity, i.e., a negative imprint of the respective teeth may be taken. Either this impression may be scanned, e.g., using an optical scanner, or the negative imprint provided by the impression may be used to generate a positive reproduction of the one or more teeth of the patient, i.e., a 3D physical tooth model or cast, which is scanned, e.g., by the optical scanner to provide the scan data used to generate the 3D digital tooth model.

The 3D digital dentition model may be provided using scan data of the patient's oral cavity. For example, one or more teeth of the patient in the oral cavity may be scanned using an intraoral scanner, e.g., an optical intraoral scanner. The scan may comprise at least a part of the dentition of the patient, e.g., a mandibular dental arch and/or maxillary dental arch of the patient's dentition. The achieved scan data may be used to provide the 3D digital dentition model. Alternatively, an impression of one or more teeth of the patient's oral cavity, i.e., a negative imprint of the respective teeth may be taken. Either this impression may be scanned, e.g., using an optical scanner, or the negative imprint provided by the impression may be used to generate a positive reproduction of the one or more teeth of the patient, i.e., a 3D physical teeth model or cast, which is scanned, e.g., by the optical scanner to provide the scan data used to generate the 3D digital dentition model.

In order to add data regarding the inner jaw structure of the patient to the to the 3D digital dentition model scan data of the patient's inner jaw structure, e.g., a CT scan, may be used. For example, a focal plane tomography may be used with images of multiple planes being taken to generate, e.g., a composite panoramic image. For example, scan data acquired using cone-beam computed tomography (CBCT), also referred to as digital volume tomography (DVT), may be used.

As shown in FIG. 3 a straight fastening channel 130 extends through the 3D digital artificial tooth model 102 from the 3D digital implant model 107 to a mouth 104. The straight fastening channel 130 extends concentrically along a central longitudinal axis 120 of the 3D digital implant model 107. In case of FIG. 3, the mouth 104 is arranged within a labial section of the outer surface of the 3D digital artificial tooth model 102 adjacent to an incisal edge of the 3D digital artificial tooth model 102. This position of the mouth 104 may be disadvantageous for aesthetical reasons as well as in regard of the stability of an artificial tooth manufactured using the 3D digital artificial tooth model 102 with the straight fastening channel 130 as a template. In case the mouth 104 is arranged within a labial section of the artificial tooth, the mouth 104 may even be visible after the fastening channel 130 has been filled up. Furthermore, the thickness of the 3D digital artificial tooth model 102 adjacent to the incisal edge may undercut a minimum thickness required for the restoration material intended to be used for manufacturing the artificial tooth. Thus, the stability and durability of the artificial tooth may be endangered. Finally, it may be challenging to fill up the mouth 104 near the incisal edge.

Figure 4:
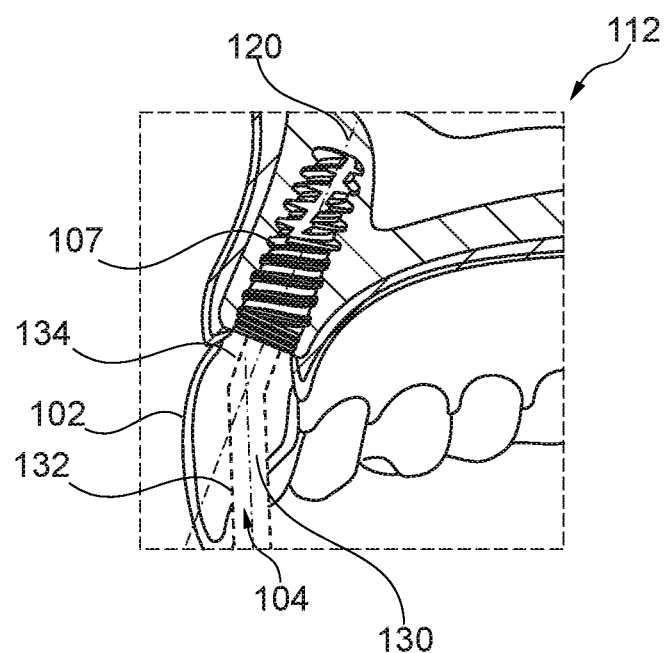
FIG. 4 shows a cross-sectional view of an exemplary 3D digital restoration model with a tilted fastening channel.

FIG. 4 shows a cross-sectional view of the 3D digital dentition model 112 of FIG. 3 with the 3D digital artificial tooth model 102 and the 3D digital implant model 107. The fastening channel 130 of FIG. 4 is not straight anymore, i.e., the fastening channel 130 does not extend concentrically along a central longitudinal axis 120 of the 3D digital implant model 107. The fastening channel 130 is rather angulated, i.e., tilted. A first straight section 132 of the fastening channel 130 is tilted relative to a second first straight section 134 by a tilt angle between the central longitudinal axis 120 of the 3D digital implant model 107 and the first straight section 132 of the fastening channel 130. Only the second first straight section 134 of the fastening channel 130 still extends concentrically along a central longitudinal axis 120 of the 3D digital implant model 107. As a result of the angulation, the mouth 104 of the fastening channel 130 is not arranged within the labial section of the 3D digital artificial tooth model 102, but within a palatal section. In addition, the mouth 104 of the fastening channel 130 is further distanced away from the incisal edge of the 3D digital artificial tooth model 102. Thus, the mouth 104 may not be visible from the outside of the oral cavity anymore, the thickness of the 3D digital artificial tooth model 102 around the mouth 104 may be equal or larger than the required minimum thickness. Finally, the mouth 104 and thus the fastening channel 130 may still be easily accessible for inserting a retaining means, e.g., a screw, and fastening means, e.g., a screw driver, in order to fixate the dental restoration defined by the 3D digital artificial tooth model 102 at the implant defined by the 3D digital implant model 107.

Figure 5:
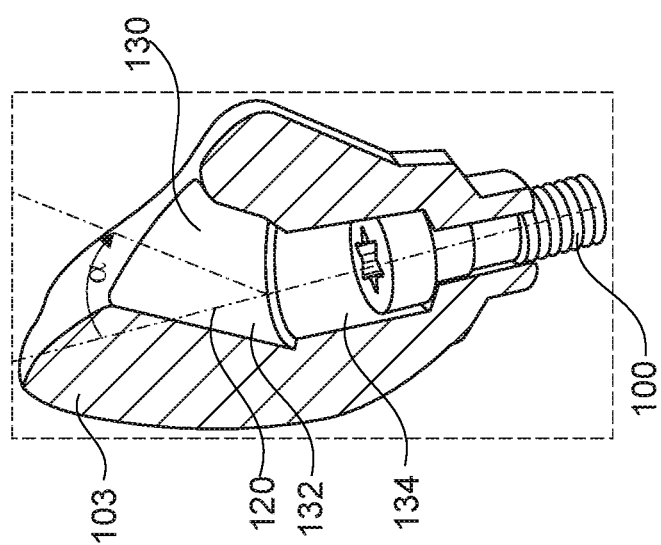
FIG. 5 shows a cross-sectional view of a dental restoration with a tilted fastening channel for fastening retaining means.

FIG. 5 shows a cross-sectional view of a dental restoration in form of an artificial tooth 103 comprising a tilted fastening channel 130 for fastening retaining means 100, e.g., a screw, at an implant (not shown).

The fastening channel 130 extending through the artificial tooth 103 is not straight, i.e., extending concentrically along a central longitudinal axis 120 of the implant, but rather tilted by a tilt angle α. A first straight section 132 of the fastening channel 130 is tilted relative to a second first straight section 134 by the tilt angle α between the central longitudinal axis 120 of the implant and the first straight section 132 of the fastening channel 130. Only the second first straight section 134 of the fastening channel 130 still extends concentrically along a central longitudinal axis 120 of the implant. As a result of the angulation, the mouth 104 of the fastening channel 130 is arranged within a palatal or lingual section of the artificial tooth 103. Thus, the mouth 104 of the fastening channel 130 may be hidden from sight and the material thickness around the fastening channel 130 may exceed a required minimum thickness ensuring stability and durability of the artificial tooth 103.

Figure 6:
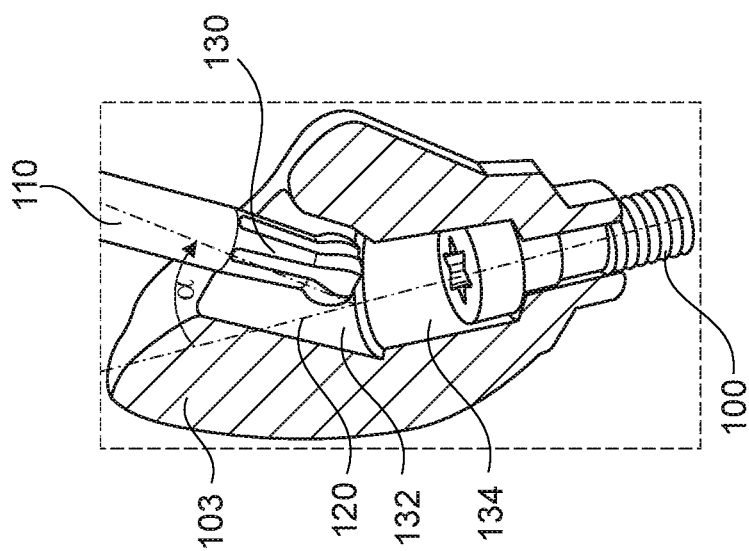
FIG. 6 shows a cross-sectional view of a dental restoration with a tilted fastening channel for fastening retaining means.

FIG. 6 shows a cross-sectional view of the artificial tooth 103 of FIG. 5 comprising the tilted fastening channel 130. In addition to the screw 100, fastening means 110 in form of a screw driver 110 are inserted into the fastening channel 130 via the mouth 104 for fastening the screw 100 at an implant, e.g., screwing the screw 100 into a female threat of the implant.

Figure 7:
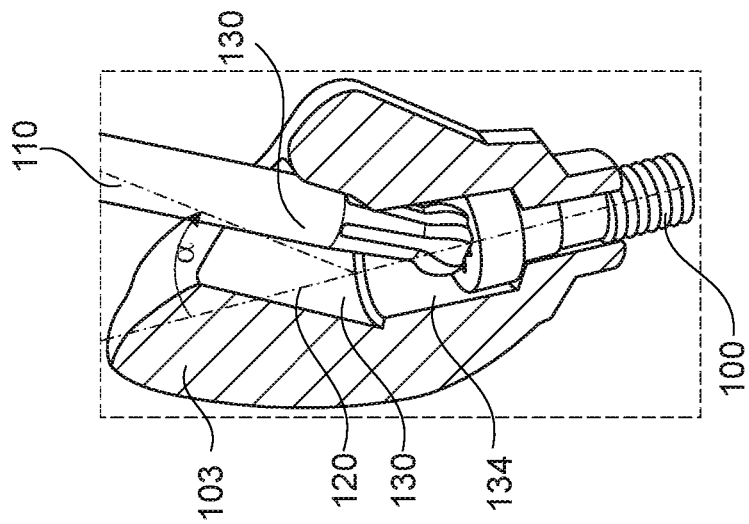
FIG. 7 shows a cross-sectional view of a dental restoration with a tilted fastening channel for fastening retaining means.

FIG. 7 shows a cross-sectional view of the artificial tooth 103 of FIG. 6 comprising the tilted fastening channel 130. The screw driver 110 is in contact with the screw 100 and operated to fasten the screw 100, e.g., screwing the screw 100 into a female threat of the implant.

Figure 8:
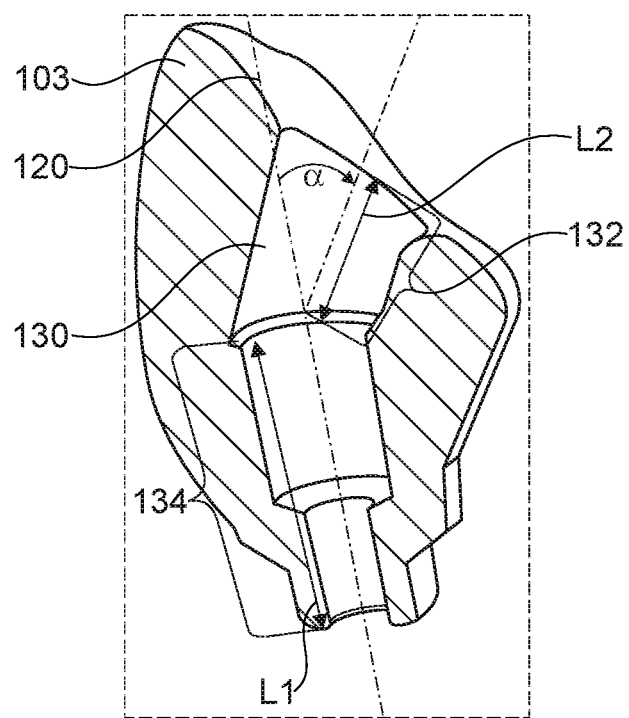
FIG. 8 shows a cross-sectional view of a dental restoration with a tilted fastening channel.

FIG. 8 show a cross-sectional view of the dental restoration in form of the artificial tooth 103 of FIG. 5 comprising the tilted fastening channel 130. The fastening channel 130 extending through the artificial tooth 103 is not straight, i.e., extending concentrically along a central longitudinal axis 120 of the implant, but rather tilted by a tilt angle α. The first straight section 132 of the fastening channel 130 is tilted relative to the second first straight section 134 by the tilt angle α between the central longitudinal axis 120 of the implant and the first straight section 132 of the fastening channel 130. Only the second first straight section 134 of the fastening channel 130 still extends concentrically along a central longitudinal axis 120 of the implant. As a result of the angulation, the mouth 104 of the fastening channel 130 is arranged within a palatal or lingual section of the artificial tooth 103. Thus, the mouth 104 of the fastening channel 130 may be hidden from sight and the material thickness around the fastening channel 130 may exceed a required minimum thickness ensuring stability and durability of the artificial tooth 103.

The second straight section 134 has a first length L1. The first straight section 132 has a second length L2. By adjusting the first length L1 of the second straight section 134, the position of the mouth 104 within the surface of the artificial tooth 103 may be adjusted along a line. The second length L2 of the first straight section 132 may, e.g., depend on the first length L1 of the second straight section 134. The first straight section 132 extends from the end of the second straight section 134 to the surface of the artificial tooth 103. Without modifying the tilt angle α, the second length L2 may, e.g., increase, when the first length L1 decreases, and decrease, when the first length L1 increases.

Figure 9:
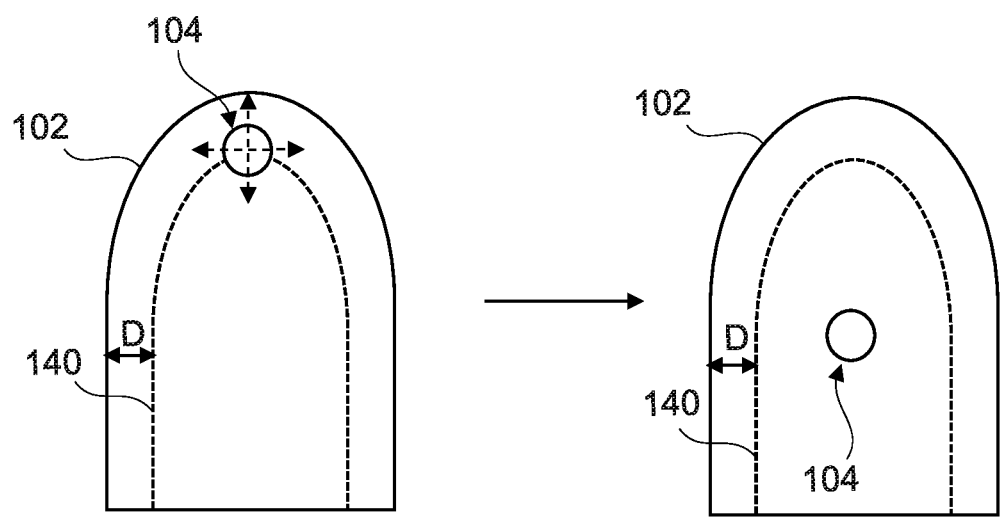
FIG. 9 shows an exemplary positioning of a mouth of a fastening channel within an outer surface of an artificial tooth.

FIG. 9 shows an exemplary positioning of a mouth 104 of a fastening channel within an outer surface of an artificial tooth defined by a 3D digital artificial tooth model 102. The mouth 104 may be arranged at a position within the outer surface of the 3D digital artificial tooth model 102 at with a minimum thickness D of the 3D digital artificial tooth model 102 around the mouth 104 is under cut. Thus, stability and durability of the artificial tooth defined by the 3D digital artificial tooth model 102 may be endangered. By tilting the fastening channel, the mouth 104 may be moved up and down within the outer surface of the digital artificial tooth model 102. The mouth 104 may also be moved up and down within the outer surface of the digital artificial tooth model 102 by increasing or decreasing a first length of a second straight section of the fastening channel extending concentrically along a central longitudinal axis of an implant. By rotating the fastening channel around the central longitudinal axis of the implant, the mouth 104 may be moved left and right within the outer surface of the digital artificial tooth model 102. Thus, by adjusting the position of the fastening channel as described above, the mouth 104 may be moved within a section 140 of the outer surface of the digital artificial tooth model 102, within which a thickness of the restoration material of the artificial tooth defined by the 3D digital artificial tooth model 102 exceeds a minimum thickness D required for a sufficient stability and durability of the artificial tooth.

Figure 10:
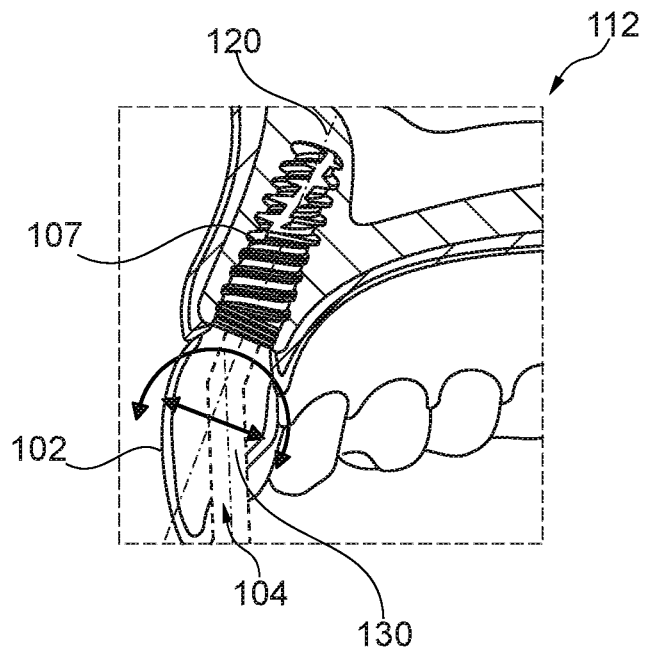
FIG. 10 shows a cross-sectional view of an exemplary 3D digital restoration model with a re-positioning of the dental restoration.

FIG. 10 shows the cross-sectional view of the 3D digital dentition model 112 of FIG. 4 with the 3D digital artificial tooth model 102 and the 3D digital implant model 107. In FIG. 10 a re-positioning of the 3D digital artificial tooth model 102 is indicated. The re-positioning of the 3D digital artificial tooth model 102 may comprise an adjusting of the position of the 3D digital artificial tooth model 102 indicated by the straight arrow. Alternatively or additionally, the re-positioning of the 3D digital artificial tooth model 102 may comprise an adjusting of the orientation of the 3D digital artificial tooth model 102 indicated by the curved arrow. By re-positioning the 3D digital artificial tooth model 102 relative to the 3D digital implant model 107, while maintaining the position of the fastening channel 130 relative to the 3D digital implant model 107, a position of the fastening channel relative to the 3D digital artificial tooth model 102 may be modified. This modification may result in a disadvantageous position of the fastening channel 130 within the 3D digital artificial tooth model 102 violating one or more pre-defined positioning criteria. By the automatically adjusting of the angulation of the fastening channel 130, the position of the fastening channel 130 within the 3D digital artificial tooth model 102 may be adjusted such that the positioning criteria are satisfied.

The re-positioning of the 3D digital artificial tooth model 102 may be based on a user input, e.g., provided via a graphical user interface displayed on a display. The automatic adjustment of the angulation of the fastening channel 130 may be displayed dynamically in response to a dynamic re-positioning of the dental restoration. The output on the display may, e.g., comprise a visual representation of the 3D digital dentition model 112 with the 3D digital artificial tooth model 102, the dynamically adjusted fastening channel 130 and the 3D digital implant model 107. For example, the automatically adjusting of the angulation of the fastening channel 130 may be displayed in real time. Thus, adjustments of the angulation of the fastening channel 130 may be provided on-the-fly, e.g., while re-positioning the 3D digital artificial tooth model 102.

Alternatively or additionally, the shape of the artificial tooth defined by the 3D digital artificial tooth model 102 may be amended, while maintaining the position of the fastening channel 130 relative to the 3D digital implant model 107. The shape of the 3D digital artificial tooth model 102 may, e.g., be amended to fit the artificial tooth defined by the 3D digital artificial tooth model 102 into the dentition of the patient as defined by the 3D digital artificial dentition model 112. The shape of the 3D digital artificial tooth model 102 may, e.g., be amended to adjust the 3D digital artificial tooth model 102 to aesthetical and/or anatomical features of the patient's dentition as defined by the 3D digital artificial dentition model 112.

The position of the fastening channel 130 relative to the amended 3D digital artificial tooth model 102 is determined. In case the position of the fastening channel 130 extending through the amended 3D digital artificial tooth model 102 violates the set of one or more pre-defined positioning criteria, the angulation of the fastening channel 130 is automatically adjusted such that the positioning criteria are satisfied.

Figure 11:
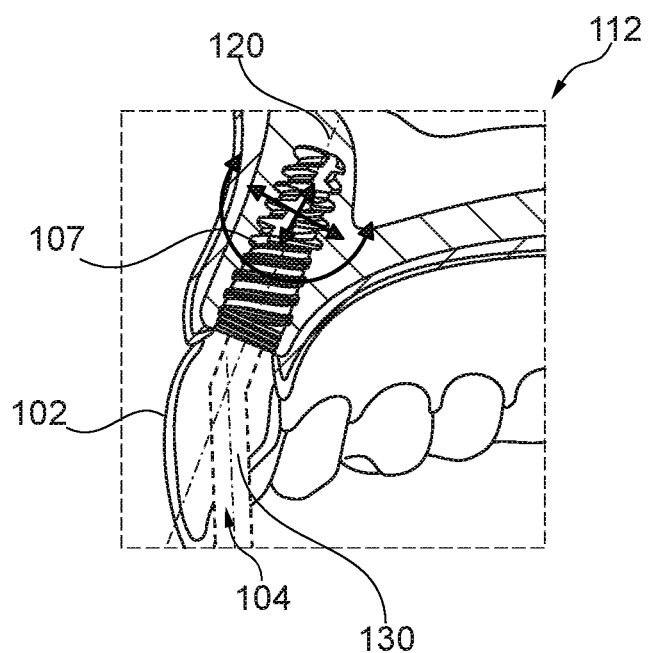
FIG. 11 shows a cross-sectional view of an exemplary 3D digital restoration model with a re-positioning of the implant.

FIG. 11 shows the cross-sectional view of the 3D digital dentition model 112 of FIG. 4 with the 3D digital artificial tooth model 102 and the 3D digital implant model 107. In FIG. 10 a re-positioning of the 3D digital implant model 107 is indicated. The re-positioning of the 3D digital implant model 107 may comprise an adjusting of the position of the 3D digital implant model 107 indicated by the straight arrow. Alternatively or additionally, the re-positioning of the 3D digital implant model 107 may comprise an adjusting of the orientation of the 3D digital implant model 107 indicated by the curved arrow. By re-positioning the 3D digital implant model 107 relative to the 3D digital artificial tooth model 102, while maintaining the position of the fastening channel 130 relative to the 3D digital implant model 107, a position of the fastening channel 130 relative to the 3D digital artificial tooth model 102 may be modified. This modification may result in a disadvantageous position of the fastening channel 130 within the 3D digital artificial tooth model 102 violating one or more pre-defined positioning criteria. By the automatically adjusting of the angulation of the fastening channel 130, the position of the fastening channel 130 within the 3D digital artificial tooth model 102 may be adjusted such that the positioning criteria are satisfied.

The re-positioning of the 3D digital implant model 107 may be based on a user input, e.g., provided via a graphical user interface displayed on a display. The automatic adjustment of the angulation of the fastening channel 130 may be displayed dynamically in response to a dynamic re-positioning of the 3D digital implant model 107. The output on the display may, e.g., comprise a visual representation of the 3D digital artificial tooth model 102, the dynamically adjusted fastening channel 130 and the 3D digital implant model 107. For example, the automatically adjusting of the angulation of the fastening channel 130 may be displayed in real time. Thus, adjustments of the angulation of the fastening channel 130 may be provided on-the-fly, e.g., while re-positioning the 3D digital implant model 107.

Figure 12:
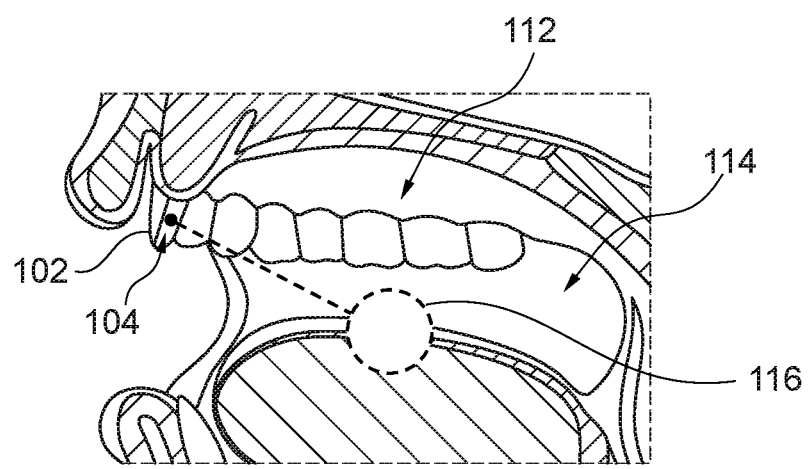
FIG. 12 shows a cross-sectional view of an exemplary oral cavity of a patient.

FIG. 12 shows a cross-sectional view of an exemplary oral cavity 150 of a patient. A maxillary dental arch 152 is shown comprising an artificial tooth of a dental restoration. The artificial tooth is defined by a 3D digital artificial tooth model 102. A mouth 104 of a fastening channel is arranged within a palatal surface of the 3D digital artificial tooth model 102. A positioning criterion may be that a first straight section of the fastening channel is pointing towards a center 116 of the oral cavity 114 of the patient. Using the 3D digital dentition model 112 the center 116 of the oral cavity 114 of the patient may be defined and the first straight section checked, whether it satisfies this positioning criterion. For example, it may be tested, whether a central longitudinal axis of the first straight section intersects the center 116 of the oral cavity 114. The center 116 in FIG. 12 is a center region, e.g., a three-dimensional region of space arranged at the center of the oral cavity of the patient. Alternatively, a point center or a two-dimensional region of space may be used as the center for checking the position and orientation of the first straight section of the fastening channel. In case the first straight section of the fastening channel violates the positioning criterion, the position of the fastening channel is automatically adjusted within the 3D digital artificial tooth model 102 by angulating the fastening channel such that the positioning criterion is satisfied.

Figure 13:
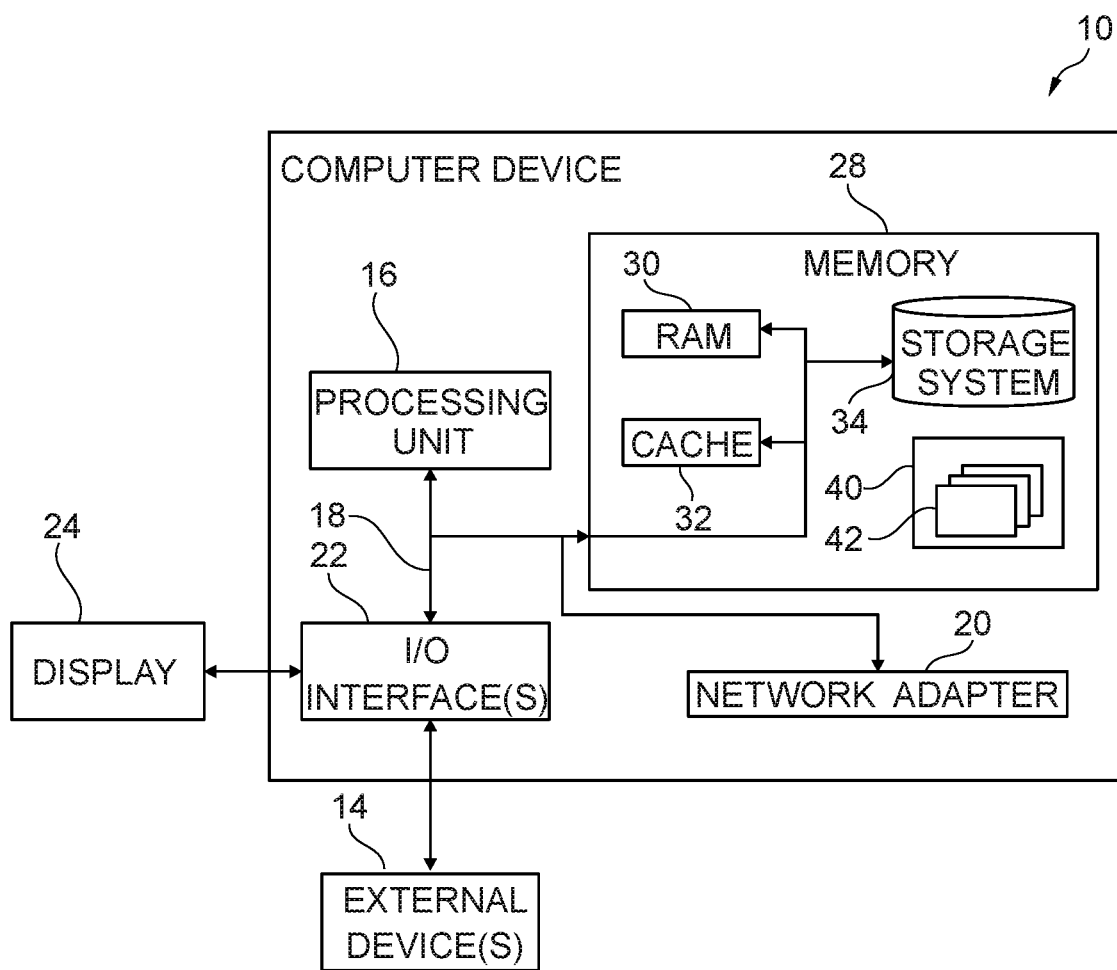
FIG. 13 shows an exemplary computer device for providing templates for configuring a fastening channel through a dental restoration.

FIG. 13 shows a schematic diagram of an exemplary computer device 10 for configuring a fastening channel through a dental restoration. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 13, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a 3D digital restoration model. The 3D digital restoration model may at least comprise a 3D artificial tooth model. The 3D artificial tooth model may, e.g., be generated on or received by the computer device 10. Memory 28 may, e.g., include a set of 3D digital artificial tooth models of library teeth, from which the 3D digital artificial tooth model is selectable. The 3D digital restoration model may, e.g., comprise further elements, like a 3D digital abutment model defining an abutment. The 3D digital abutment model may, e.g., be generated on or received by the computer device 10. Memory 28 may, e.g., include a set of 3D digital abutment models, from which the 3D digital abutment model is selectable. Memory 28 may, e.g., include a 3D digital implant model. The 3D digital implant model may, e.g., be generated on or received by the computer device 10. Memory 28 may, e.g., include a 3D digital dentition model. The 3D digital dentition model may, e.g., be generated on or received by the computer device 10. Memory 28 may, e.g., include scan data of the patient's oral cavity for generating the 3D digital dentition model. The scan data may, e.g., comprise data of an intraoral optical scan, a CT scan, and/or a CBCT scan.

Memory 28 may, e.g., comprise a trained machine learning module trained for automatically adjusting the position of the fastening channel. The trained machine learning module may be configured to provide an adjusted position of the fastening channel within the artificial tooth as an output in response to receiving the 3D digital restoration model of the dental restoration and a definition of a fastening channel as input. The trained machine learning module may, e.g., further be configured to take into account a minimum thickness of the restoration material for angulating the fastening channel such that the positioning criteria are satisfied. For example, the input may further comprise an identifier identifying a required minimum thickness of the restoration material to be used to manufacture the artificial tooth of the dental restoration.

The trained machine learning module may, e.g., be received by the computer device 10. The trained machine learning module may, e.g., be trained by the computer device 10 using training datasets with training data received and/or generated by the computer device 10. For training the machine learning module, the memory 28 may comprise a machine learning module to be trained as well as training datasets with training data for training the machine learning module to be trained for generating the 3D digital restoration model. The machine learning module to be trained may, e.g., be an untrained machine learning module, a pre-trained machine learning module or a partially trained machine learning module.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may be configured for configuring a fastening channel through a dental restoration for fastening a retaining means retaining the dental restoration. One of the program modules 42 may, e.g., be configured to use a trained machine learning module for automatically adjusting the position of the fastening channel. The trained machine learning module may be configured to provide an adjusted position of the fastening channel within the artificial tooth as an output in response to receiving the 3D digital restoration model of the dental restoration and a definition of a fastening channel as input. The trained machine learning module may, e.g., further be configured to take into account a minimum thickness of the restoration material for angulating the fastening channel such that the positioning criteria are satisfied. One of the program modules 42 may, e.g., be configured to train a machine learning module to be trained to automatically adjust the position of the fastening channel. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 13 may be configured for configuring a fastening channel through a dental restoration for fastening a retaining means retaining the dental restoration. The computer device 10 may be a standalone computer with no network connectivity that may receive data to be processed through a local interface. The data received by computer device 10 may for example comprise scan data of a patient's mouth from an intraoral scan or from a scan of a classical mold/impression, e.g., providing information about the surface structure of the patient's intraoral hard and/or soft tissue. The data received by computer device 10 may, e.g., further comprise scan data of the internal tissue, e.g., bone, structure of the patient's jaws, e.g., in form of CT scan data and/or CBCT scan data. This data may be used to provide a 3D digital dentition model of the patient's oral cavity and/or internal tissue structure. Alternatively, the data received by computer device 10 may, e.g., comprise the 3D digital dentition model. The data received by computer device 10 may for example comprise a 3D digital restoration model. The 3D digital restoration model may at least comprise a 3D artificial tooth. The data received by computer device 10 may for example comprise a set of 3D digital artificial tooth models of library teeth, from which the 3D digital artificial tooth model is selected. The selected model may, e.g., be adjusted to anatomical and/or aesthetical features of the patient's dentition. The 3D digital restoration model may, e.g., comprise further elements, like a 3D digital abutment model defining an abutment. The data received by computer device 10 may for example comprise a 3D digital implant model. The data received by computer device 10 may for example comprise a set of 3D digital abutment models, from which the 3D digital abutment model is selected. The selected model may, e.g., be adjusted to anatomical and/or aesthetical features of the patient's dentition.

The data received by computer device 10 may for example comprise a trained for automatically adjusting the position of the fastening channel. The trained machine learning module may be configured to provide an adjusted position of the fastening channel within the artificial tooth as an output in response to receiving the 3D digital restoration model of the dental restoration and a definition of a fastening channel as input. The trained machine learning module may, e.g., further be configured to take into account a minimum thickness of the restoration material for angulating the fastening channel such that the positioning criteria are satisfied. For example, the input may further comprise an identifier identifying a required minimum thickness of the restoration material to be used to manufacture the artificial tooth of the dental restoration. The data received by computer device 10 may for example comprise a machine learning module to be trained. The machine learning module to be trained may, e.g., be an untrained machine learning module, a pre-trained machine learning module or a partially trained machine learning module. The data received by computer device 10 may for example comprise training datasets for training the machine learning module to be trained for generating the 3D digital restoration model. The computer device 10 may be used for manufacturing the dental restoration using a 3D digital restoration model with the configured fastening channel as a template. For example, a 3D digital artificial tooth model may be used as a template for manufacturing an artificial tooth with the fastening channel. Such operation may, however, likewise be performed using a computer device that is connected to a network such as a communications network and/or a computing network.

Figure 14:
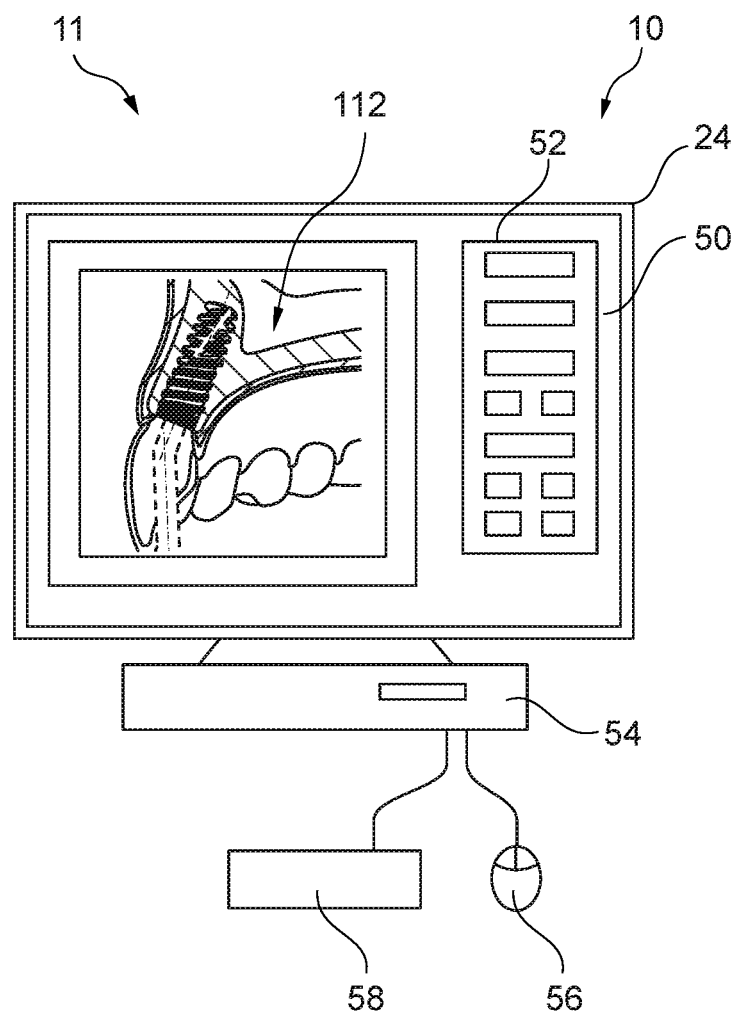
FIG. 14 shows an exemplary computer device for providing templates for configuring a fastening channel through a dental restoration.

FIG. 14 shows an exemplary system computer device 10 for configuring a fastening channel through a dental restoration for fastening a retaining means retaining the dental restoration. The computer device 10 may, e.g., be configured as shown in FIG. 13. The computer device may comprise a hardware component 54 comprising one or more processors as well as a memory storing machine-executable program instructions. Execution of the program instructions by the one or more processors may cause the one or more processors to control the computer device 10 to configure the fastening channel through the dental restoration.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the configuring of the fastening channel. A 3D digital restoration model of a dental restoration comprising an artificial tooth and a definition of an implant comprising a central longitudinal axis of the implant are provided. These models and definitions may, e.g., be provided in form of or in addition to a 3D digital dentition model 112. A relative positioning of the dental restoration relative to the implant is determined. A position of the fastening channel extending from the implant through the artificial tooth is determined. The fastening channel comprises a first end and a second end. The first end is a connecting end providing a connection to the implant. The second end is a mouth within an outer surface of the artificial tooth configured for receiving a fastening means for fastening the retaining means to retain the dental restoration on the implant. In case the position of the fastening channel violates a set of one or more pre-defined positioning criteria, the position of the fastening channel is automatically adjusted by angulating the fastening channel such that the positioning criteria are satisfied. The angulating of the fastening channel comprises tilting a first straight section of the fastening channel relative to a second straight section of the fastening channel. The second straight section is a straight extension of the central longitudinal axis of the implant extending from the first end of the fastening channel to the first straight section. The first straight section extends from the second straight section to the second end of the fastening channel. The computer device 10 may comprise a scanner 59, e.g., an optical scanner for scanning a patient's oral cavity, an imprint of a patient's oral cavity and/or a positive of a patient's oral cavity generated using an imprint. A scanner 59 may, e.g., be configured acquiring scan data of the internal tissue, e.g., bone, structure of the patient's jaws, e.g., in form of CT scan data and/or CBCT scan data.

The input devices 54, 56, may enable a user to dynamically re-position the 3D digital restoration model, e.g., a 3D digital artificial tooth model, and/or the 3D digital implant model. The input devices 54, 56, may enable a user to dynamically amending the shape of the 3D digital restoration model, e.g., a 3D digital artificial tooth model, and/or the 3D digital implant model. This re-positioning and/or amending may be displayed on the display 24 providing the graphical user interface 50. For example, the automatically adjusting of the angulation of the fastening channel is dynamically displayed simultaneously with the dynamically displaying of the re-positioning and/or amending. The re-positioning and/or amending adjusting of the position of the fastening channel may be displayed in real time. Thus, adjustments of the position of the fastening channel may be provided on-the-fly, e.g., while adjusting position, orientation and/or form of the dental restoration and/or the implant.

Figure 15:
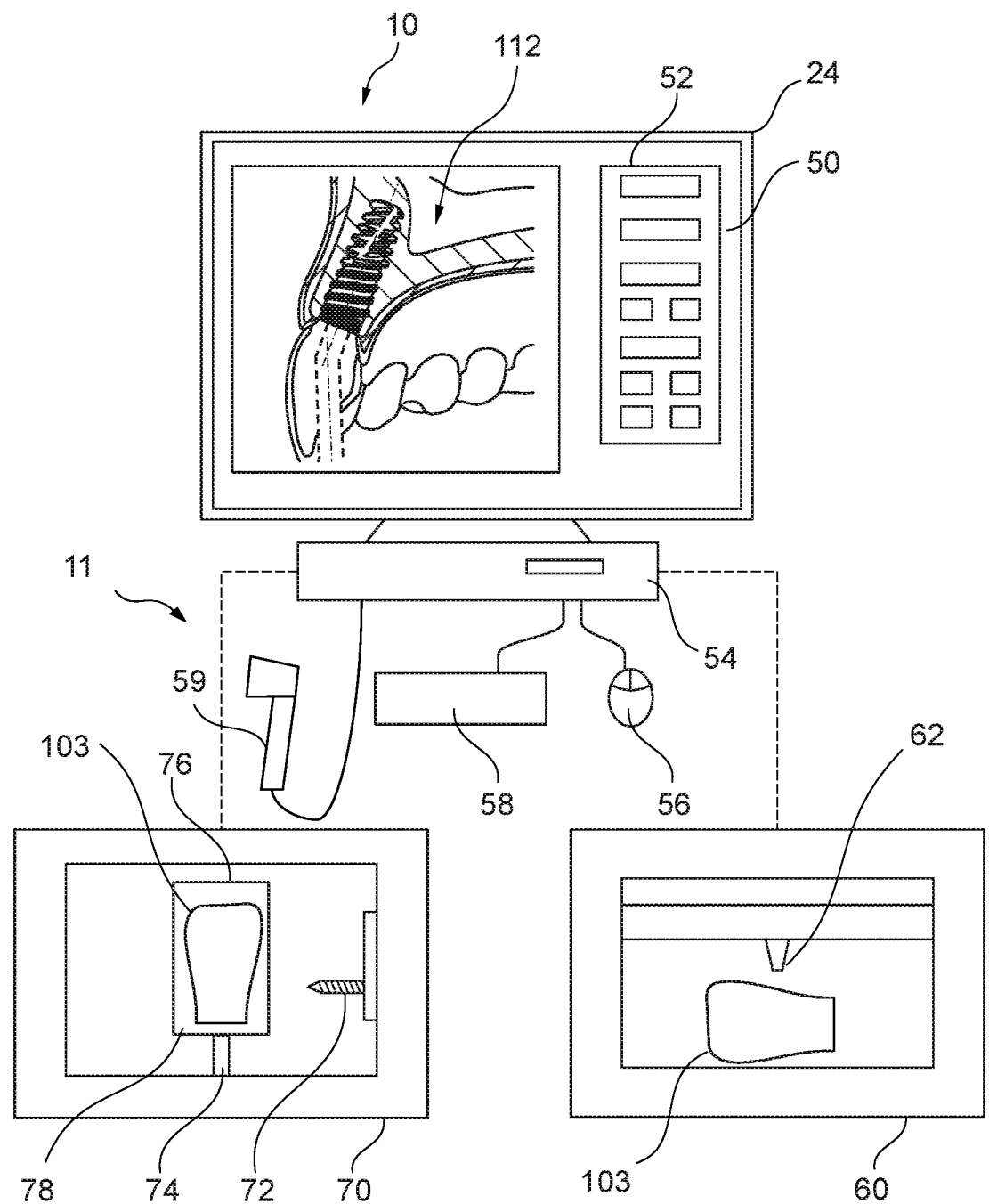
FIG. 15 shows an exemplary manufacturing system for manufacturing a dental restoration.

FIG. 15 shows an exemplary manufacturing system 11 for manufacturing a dental restoration, e.g., a crown 113, using a 3D digital restoration model as template. The 3D digital restoration model may be arranged within a 3D digital dentition model 112 and comprising a fastening channel extending through the dental restoration and configured for fastening a retaining means retaining the dental restoration.

The manufacturing system 11 may comprise the computer device 10 of FIG. 14. The computer device 10 may further be configured to control one or more manufacturing devices 60, 70 to manufacture the dental restoration element 117. For example, the manufacturing system 11 may comprise a manufacturing device in form of a machining device 70 controlled by the computer device 10. The machining device 70 may be configured to machining a blank 76 of restoration material 78 using one or more machining tools 72. The blank 76 of restoration material 78, may be provided using a holding device 74 and cut into a desired shape and size of the element to be manufactured, e.g., a crown 103. The machining tool 72 may, e.g., be a milling tool. A 3D digital model, e.g., a 3D digital artificial tooth model, may provide a template for the element being manufactured using the machining device 70, e.g., the crown 111.

For example, the manufacturing system 11 may comprise a manufacturing device in form of a 3D printing device 60. The 3D printing device 60 may be controlled by the computer device 10 and configured to print an element to be manufactured, e.g., a crown 103. The 3D printing device 60 may comprise a printing element 62 configured to print the respective element, like the crown 103, layer by layer. The printing element 62 may, e.g., comprise a nozzle configured for distributing printing material, i.e., restoration material. A 3D digital model, e.g., a3D digital artificial tooth model, may provide a template of the physical element manufactured using the 3D printing device 60, e.g., the crown 103.

In case the element being manufactured comprises metal sections, the 3D printing device 60 may, e.g., be used for executing selective laser sintering or melting. Selective laser sintering uses a laser for sintering a powdered material, aiming the laser automatically at points in space defined by a 3D digital model of the element to be printed. The laser energy may result in a local sintering or melting of the powdered material, binding the material together to create a solid structure. For example, the printing element 62 of the 3D printing device 60 may comprise a laser in addition to a distributing device for distributing the powdered material.

The resulting crown 103 comprises the fastening channel. The fastening channel may, e.g., be implemented during manufacturing of the crown 103 or a crown 103 without a fastening channel is manufactured and the fastening channel implemented afterwards machining, e.g., drilling and/or milling. For example, the machining device 70 controlled by the computer device 10 may be used to implement the fastening channel into the crown 103, e.g., 3D printed using the 3D printing device 60 without the fastening channel. The restoration material used for manufacturing the dental restoration may, e.g., be a restoration material requiring a hardening, e.g., sintering. For example, the fastening channel may be implemented before hardening the dental restoration.

In case the restoration material used to manufacture the crown 103 is a restoration material requiring a hardening, e.g., sintering, the 3D digital artificial tooth model defining the crown 103 may be scaled up and the scaled-up version of the 3D digital artificial tooth model may be used as a template for manufacturing the crown 103. The 3D digital artificial tooth model may be scaled up using a scaling factor, which is an inverse of a shrinking factor quantifying a shrinking of the crown 103 due to the hardening, e.g., sintering. Thus, by scaling up the 3D digital artificial tooth model the shrinking of the crown 103 due to the hardening, e.g., sintering, may be compensated.

Figure 16:
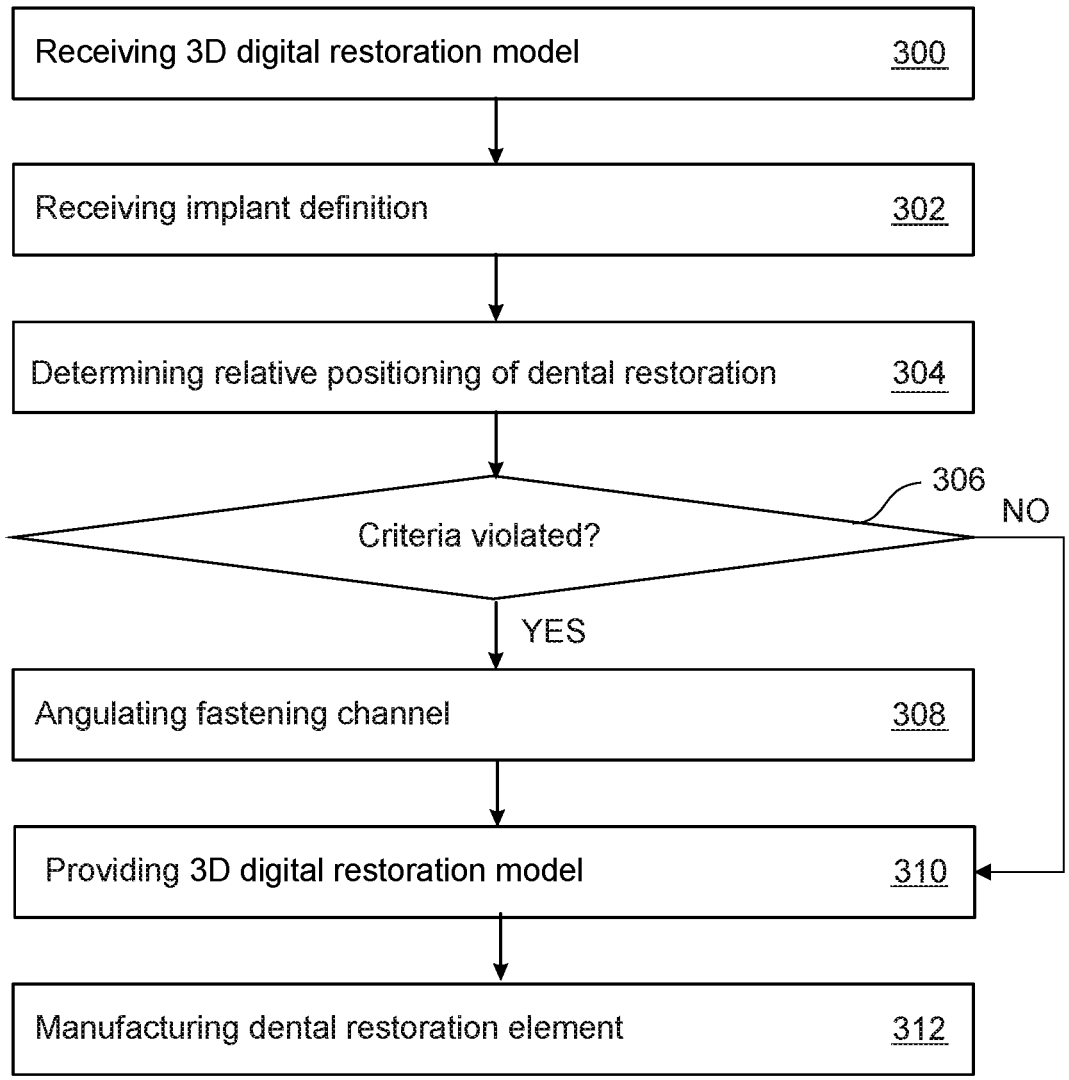
FIG. 16 shows a flowchart illustrating an exemplary method for configuring a fastening channel through a dental restoration.

FIG. 16 shows a flowchart illustrating an exemplary method for configuring a fastening channel through a dental restoration. The fastening channel is implemented in order to enable a fastening of retaining means retaining the dental restoration at an implant. In block 300, the 3D digital restoration model of the dental restoration is received. The dental restoration comprises an artificial tooth. The 3D digital restoration model may comprise a 3D digital artificial tooth model. In block 302, a definition of the implant is received. For example, the definition may be received in form of a 3D digital implant model arranged within a 3D digital dentition model. The implant defined by the 3D digital implant model is configured to receive the retaining means to retain the dental restoration defined by the 3D digital restoration model on the implant. The definition of the implant comprises a central longitudinal axis of the implant.

In block 304, a relative positioning of the dental restoration relative to the implant is determined. The fastening channel comprises a first end and a second end. The first end is a connecting end providing a connection to the implant. The second end is a mouth within an outer surface of the artificial tooth configured for receiving a fastening means for fastening the retaining means to retain the dental restoration on the implant.

In block 306, it is checked, whether the position of the fastening channel violates a set of one or more pre-defined positioning criteria. The positioning criteria may, e.g., comprise one or more of the following: a material thickness of a material of the artificial tooth extending radially at all sides around the fastening channel being exceeding a pre-defined material depending minimum thickness; the material thickness of the material of the artificial tooth extending radially at all sides around the fastening channel being maximized, while the mouth of the fastening channel being located within a first section of the outer surface of the artificial tooth; the mouth of the fastening channel being located within a second section of the outer surface of the artificial tooth, the second section being assigned as sufficiently restricting a visibility of the mouth from outside an oral cavity of the patient; the mouth of the fastening channel being located within a third section of the outer surface of the artificial tooth, the third section assigned as being accessible for a fastening means; the first straight section of the fastening channel pointing towards a center of the oral cavity of the patient. The positioning criteria comprised by the set of positioning criteria may, e.g., be weighted relative to each other using weight factors assigned to the individual positioning criteria.

In case the pre-defined positioning criteria are not violated, the method continues with block 310. In case the pre-defined positioning criteria are violated, the method continues with block 308. In block 308, the position of the fastening channel is automatically adjusted by angulating the fastening channel such that the positioning criteria are satisfied. The angulating of the fastening channel comprises tilting a first straight section of the fastening channel relative to a second straight section of the fastening channel. The second straight section is a straight extension of the central longitudinal axis of the implant extending from the first end of the fastening channel to the first straight section. The first straight section extends from the second straight section to the second end of the fastening channel. The angulating of the fastening channel may, e.g., further comprise defining a first length of the second straight section. The angulating of the fastening channel may, e.g., further comprising rotating the fastening channel around the central longitudinal axis of the implant. The fastening channel for which the position is determined may, e.g., be a straight channel. Alternatively, the fastening channel for which the position is determined may, e.g., be a pre-tilted fastening channel.

In block 310, the 3D digital restoration model with the fastening channel is provided as a template for manufacturing a physical dental restoration, e.g., an artificial tooth in form of a crown or as part of a bridge. In block 312, the restoration element is manufactured. The manufactured dental restoration is a physical copy of the respective template. The dental restoration may, e.g., be manufactured using a machining device configured to manufacture the dental restoration, e.g., a crown or bridge, by processing a blank of restoration material. The resulting dental restoration may be configured to be retained at an implant using a retaining means, e.g., a screw. For example, the dental restoration may be manufactured using a 3D printing device, i.e., a printer, configured to print the dental restoration element. The resulting dental restoration, e.g., a crown or bridge, may be configured to be retained at an implant using a retaining means, e.g., a screw. For example, the 3D digital restoration model may be used as a positive to define a negative of the physical dental restoration in form of a negative 3D digital restoration model. The negative 3D digital restoration model may be used to manufacture, e.g., using machining or 3D printing, a casting matrix. The casting matrix may, e.g., be configured for casting the physical dental restoration by inserting restoration material into the casting matrix and curing the inserted restoration material. The resulting dental restoration, e.g., a crown or bridge, may be configured to be retained at an implant using a retaining means, e.g., a screw.

The dental restoration manufactured comprises the fastening channel. The fastening channel may, e.g., be implemented during manufacturing. Alternatively, the fastening channel may, e.g., be implemented after the dental restoration has been manufactured using machining, e.g., drilling and/or milling. The restoration material used for manufacturing the dental restoration may, e.g., be a restoration material requiring a hardening, e.g., sintering. For example, the fastening channel may be implemented before hardening the dental restoration.

In case the restoration material is a restoration material requiring a hardening, e.g., sintering, the 3D digital restoration model may be scaled up and the scaled-up version of the 3D digital restoration model may be used as a template for manufacturing the dental restoration. The 3D digital restoration model may be scaled up using a scaling factor, which is an inverse of a shrinking factor quantifying a shrinking of the dental restoration due to the hardening, e.g., sintering. Thus, by scaling up the 3D digital restoration model the shrinking of the dental restoration due to the hardening, e.g., sintering, may be compensated.

Figure 17:
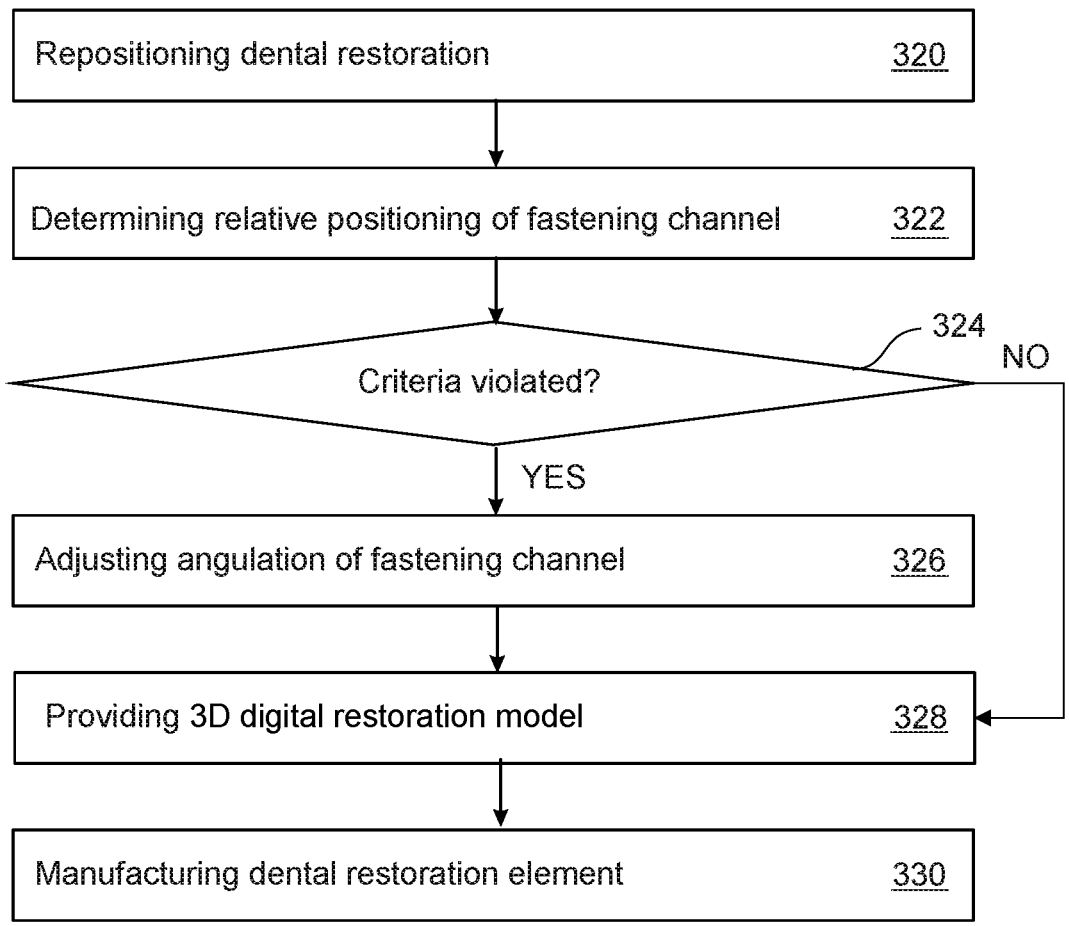
FIG. 17 shows a flowchart illustrating an exemplary method for configuring a fastening channel through a dental restoration.

FIG. 17 shows a flowchart illustrating an exemplary method for configuring a fastening channel through a dental restoration. In block 320, the dental restoration is re-positioned relative to an implant, while maintaining the position of the fastening channel relative to the implant. In block 322, a relative positioning of the re-positioned dental restoration relative to the implant is determined.

In block 324, it is checked, whether the position of the fastening channel extending through the re-positioned dental restoration violates a set of one or more pre-defined positioning criteria. The positioning criteria may, e.g., comprise one or more of the following: a material thickness of a material of the artificial tooth extending radially at all sides around the fastening channel being exceeding a pre-defined material depending minimum thickness; the material thickness of the material of the artificial tooth extending radially at all sides around the fastening channel being maximized, while the mouth of the fastening channel being located within a first section of the outer surface of the artificial tooth; the mouth of the fastening channel being located within a second section of the outer surface of the artificial tooth, the second section being assigned as sufficiently restricting a visibility of the mouth from outside an oral cavity of the patient; the mouth of the fastening channel being located within a third section of the outer surface of the artificial tooth, the third section assigned as being accessible for a fastening means; the first straight section of the fastening channel pointing towards a center of the oral cavity of the patient. The positioning criteria comprised by the set of positioning criteria may, e.g., be weighted relative to each other using weight factors assigned to the individual positioning criteria.

In case the pre-defined positioning criteria are not violated, the method continues with block 328. In case the pre-defined positioning criteria are violated, the method continues with block 326. In block 326, the position of the fastening channel is automatically adjusted by angulating the fastening channel such that the positioning criteria are satisfied. The angulating of the fastening channel may, e.g., further comprise adjusting a first length of the second straight section. The angulating of the fastening channel may, e.g., further comprising rotating the fastening channel around the central longitudinal axis of the implant. The fastening channel for which the position is determined may, e.g., be a straight channel. Alternatively, the fastening channel for which the position is determined may, e.g., be a pre-tilted fastening channel.

The re-positioning of the dental restoration may be based on a user input, e.g., provided via a graphical user interface displayed on a display. The automatic adjustment of the angulation of the fastening channel may be displayed dynamically in response to a dynamic re-positioning of the dental restoration. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while re-positioning the dental restoration.

In block 328, the 3D digital restoration model with the fastening channel is provided as a template for manufacturing a physical dental restoration, e.g., an artificial tooth in form of a crown or as part of a bridge. In block 330, the restoration element is manufactured. The manufactured dental restoration is a physical copy of the respective template. The dental restoration may, e.g., be manufactured using a machining device configured to manufacture the dental restoration, e.g., a crown or bridge, by processing a blank of restoration material. The resulting dental restoration may be configured to be retained at an implant using a retaining means, e.g., a screw. For example, the dental restoration may be manufactured using a 3D printing device, i.e., a printer, configured to print the dental restoration element. The resulting dental restoration, e.g., a crown or bridge, may be configured to be retained at an implant using a retaining means, e.g., a screw. For example, the 3D digital restoration model may be used as a positive to define a negative of the physical dental restoration in form of a negative 3D digital restoration model. The negative 3D digital restoration model may be used to manufacture, e.g., using machining or 3D printing, a casting matrix. The casting matrix may, e.g., be configured for casting the physical dental restoration by inserting restoration material into the casting matrix and curing the inserted restoration material. The resulting dental restoration, e.g., a crown or bridge, may be configured to be retained at an implant using a retaining means, e.g., a screw.

The dental restoration manufactured comprises the fastening channel. The fastening channel may, e.g., be implemented during manufacturing. Alternatively, the fastening channel may, e.g., be implemented after the dental restoration has been manufactured using machining, e.g., drilling and/or milling. The restoration material used for manufacturing the dental restoration may, e.g., be a restoration material requiring a hardening, e.g., sintering. For example, the fastening channel may be implemented before hardening the dental restoration.

In case the restoration material is a restoration material requiring a hardening, e.g., sintering, the 3D digital restoration model may be scaled up and the scaled-up version of the 3D digital restoration model may be used as a template for manufacturing the dental restoration. The 3D digital restoration model may be scaled up using a scaling factor, which is an inverse of a shrinking factor quantifying a shrinking of the dental restoration due to the hardening, e.g., sintering. Thus, by scaling up the 3D digital restoration model the shrinking of the dental restoration due to the hardening, e.g., sintering, may be compensated.

Figure 18:
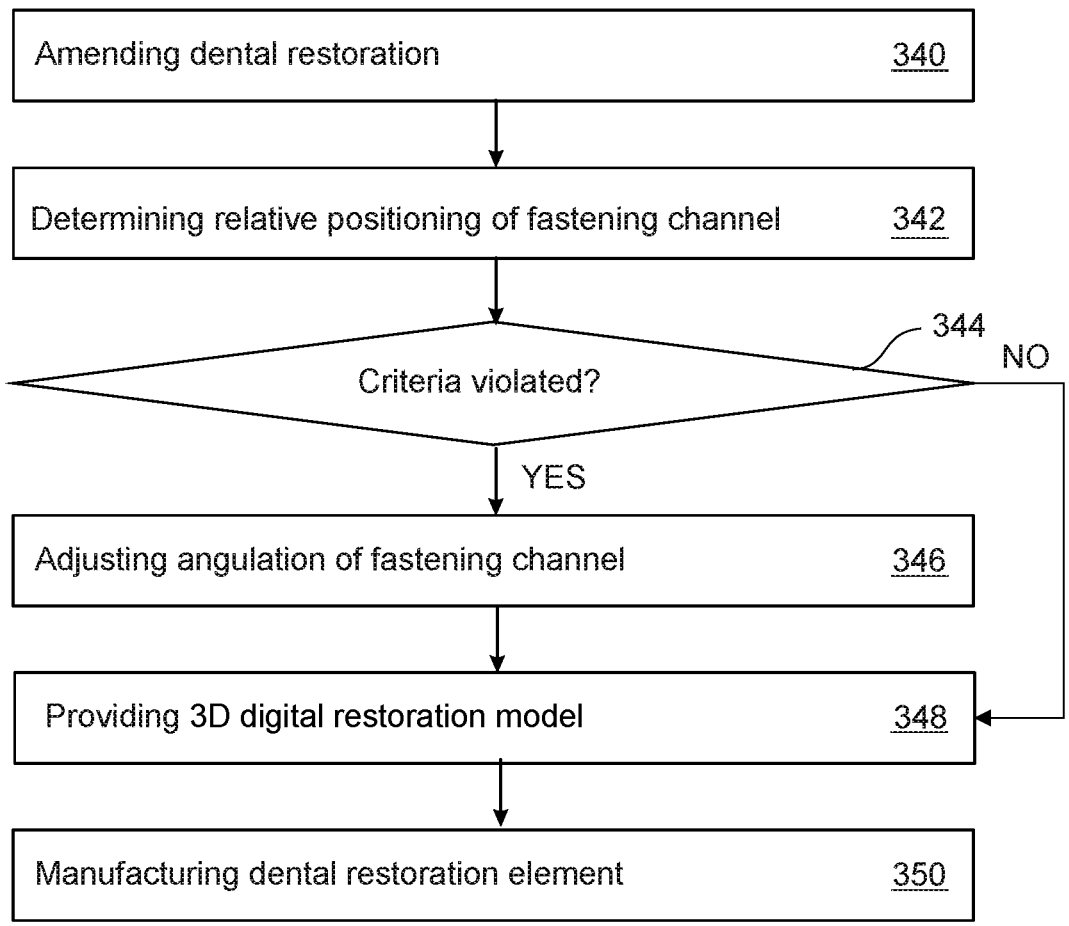
FIG. 18 shows a flowchart illustrating an exemplary method for configuring a fastening channel through a dental restoration.

FIG. 18 shows a flowchart illustrating an exemplary method for configuring a fastening channel through a dental restoration. In block 340, the dental restoration is amended. The amending of the dental restoration may, e.g., comprise amending the shape of the artificial tooth of the dental restoration, while maintaining the position of the fastening channel relative to the implant. In block 342, a relative positioning of the amended dental restoration relative to the implant is determined.

In block 344, it is checked, whether the position of the fastening channel extending through the re-positioned dental restoration violates a set of one or more pre-defined positioning criteria. The positioning criteria may, e.g., comprise one or more of the following: a material thickness of a material of the artificial tooth extending radially at all sides around the fastening channel being exceeding a pre-defined material depending minimum thickness; the material thickness of the material of the artificial tooth extending radially at all sides around the fastening channel being maximized, while the mouth of the fastening channel being located within a first section of the outer surface of the artificial tooth; the mouth of the fastening channel being located within a second section of the outer surface of the artificial tooth, the second section being assigned as sufficiently restricting a visibility of the mouth from outside an oral cavity of the patient; the mouth of the fastening channel being located within a third section of the outer surface of the artificial tooth, the third section assigned as being accessible for a fastening means; the first straight section of the fastening channel pointing towards a center of the oral cavity of the patient. The positioning criteria comprised by the set of positioning criteria may, e.g., be weighted relative to each other using weight factors assigned to the individual positioning criteria.

In case the pre-defined positioning criteria are not violated, the method continues with block 348. In case the pre-defined positioning criteria are violated, the method continues with block 346. In block 346, the position of the fastening channel is automatically adjusted by angulating the fastening channel such that the positioning criteria are satisfied. The angulating of the fastening channel comprises tilting a first straight section of the fastening channel relative to a second straight section of the fastening channel. The angulating of the fastening channel may, e.g., further comprise adjusting a first length of the second straight section. The angulating of the fastening channel may, e.g., further comprising rotating the fastening channel around the central longitudinal axis of the implant. The fastening channel for which the position is determined may, e.g., be a straight channel. Alternatively, the fastening channel for which the position is determined may, e.g., be a pre-tilted fastening channel.

The amending the shape of the artificial tooth of the dental restoration may be based on a user input, e.g., provided via a graphical user interface displayed on a display. The automatic adjustment of the angulation of the fastening channel may be displayed dynamically in response to a dynamic re-positioning of the dental restoration. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while amending the shape of the artificial tooth.

In block 348, the 3D digital restoration model with the fastening channel is provided as a template for manufacturing a physical dental restoration, e.g., an artificial tooth in form of a crown or as part of a bridge. In block 350, the restoration element is manufactured. The manufactured dental restoration is a physical copy of the respective template. The dental restoration may, e.g., be manufactured using a machining device configured to manufacture the dental restoration, e.g., a crown or bridge, by processing a blank of restoration material. The resulting dental restoration may be configured to be retained at an implant using a retaining means, e.g., a screw. For example, the dental restoration may be manufactured using a 3D printing device, i.e., a printer, configured to print the dental restoration element. The resulting dental restoration, e.g., a crown or bridge, may be configured to be retained at an implant using a retaining means, e.g., a screw. For example, the 3D digital restoration model may be used as a positive to define a negative of the physical dental restoration in form of a negative 3D digital restoration model. The negative 3D digital restoration model may be used to manufacture, e.g., using machining or 3D printing, a casting matrix. The casting matrix may, e.g., be configured for casting the physical dental restoration by inserting restoration material into the casting matrix and curing the inserted restoration material. The resulting dental restoration, e.g., a crown or bridge, may be configured to be retained at an implant using a retaining means, e.g., a screw.

The dental restoration manufactured comprises the fastening channel. The fastening channel may, e.g., be implemented during manufacturing. Alternatively, the fastening channel may, e.g., be implemented after the dental restoration has been manufactured using machining, e.g., drilling and/or milling. The restoration material used for manufacturing the dental restoration may, e.g., be a restoration material requiring a hardening, e.g., sintering. For example, the fastening channel may be implemented before hardening the dental restoration.

In case the restoration material is a restoration material requiring a hardening, e.g., sintering, the 3D digital restoration model may be scaled up and the scaled-up version of the 3D digital restoration model may be used as a template for manufacturing the dental restoration. The 3D digital restoration model may be scaled up using a scaling factor, which is an inverse of a shrinking factor quantifying a shrinking of the dental restoration due to the hardening, e.g., sintering. Thus, by scaling up the 3D digital restoration model the shrinking of the dental restoration due to the hardening, e.g., sintering, may be compensated.

Figure 19:
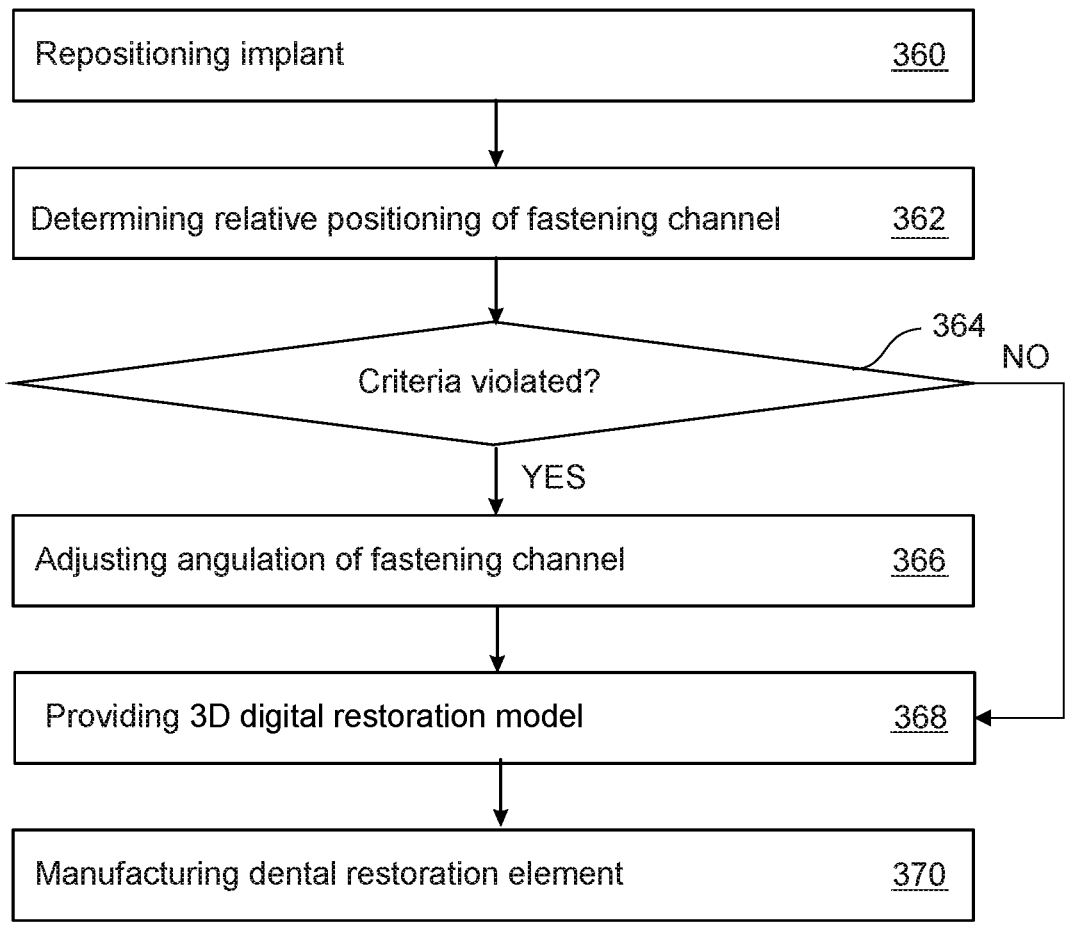
FIG. 19 shows a flowchart illustrating an exemplary method for configuring a fastening channel through a dental restoration.

FIG. 19 shows a flowchart illustrating an exemplary method for configuring a fastening channel through a dental restoration. The fastening channel is implemented for fastening a retaining means retaining the dental restoration at an implant. In block 360, the implant is re-positioned relative to the dental restoration, while maintaining the position of the fastening channel relative to the implant. In block 362, a relative positioning of the dental restoration relative to the re-positioned implant is determined.

In block 324, it is checked, whether the position of the re-positioned fastening channel extending through the dental restoration violates a set of one or more pre-defined positioning criteria. The positioning criteria may, e.g., comprise one or more of the following: a material thickness of a material of the artificial tooth extending radially at all sides around the fastening channel being exceeding a pre-defined material depending minimum thickness; the material thickness of the material of the artificial tooth extending radially at all sides around the fastening channel being maximized, while the mouth of the fastening channel being located within a first section of the outer surface of the artificial tooth; the mouth of the fastening channel being located within a second section of the outer surface of the artificial tooth, the second section being assigned as sufficiently restricting a visibility of the mouth from outside an oral cavity of the patient; the mouth of the fastening channel being located within a third section of the outer surface of the artificial tooth, the third section assigned as being accessible for a fastening means; the first straight section of the fastening channel pointing towards a center of the oral cavity of the patient. The positioning criteria comprised by the set of positioning criteria may, e.g., be weighted relative to each other using weight factors assigned to the individual positioning criteria.

In case the pre-defined positioning criteria are not violated, the method continues with block 368. In case the pre-defined positioning criteria are violated, the method continues with block 366. In block 366, the position of the fastening channel is automatically adjusted by angulating the fastening channel such that the positioning criteria are satisfied. The angulating of the fastening channel comprises tilting a first straight section of the fastening channel relative to a second straight section of the fastening channel. The angulating of the fastening channel may, e.g., further comprise adjusting a first length of the second straight section. The angulating of the fastening channel may, e.g., further comprising rotating the fastening channel around the central longitudinal axis of the implant. The fastening channel for which the position is determined may, e.g., be a straight channel. Alternatively, the fastening channel for which the position is determined may, e.g., be a pre-tilted fastening channel.

The re-positioning of the implant may be based on a user input, e.g., provided via a graphical user interface displayed on a display. The automatic adjustment of the angulation of the fastening channel may be displayed dynamically in response to a dynamic re-positioning of the implant. The output on the display may, e.g., comprise a visual representation of the dental restoration, the dynamically adjusted fastening channel and the implant. For example, the automatically adjusting of the angulation of the fastening channel may be displayed in real time. Thus, adjustments of the angulation of the fastening channel may be provided on-the-fly, e.g., while re-positioning the implant.

In block 368, the 3D digital restoration model with the fastening channel is provided as a template for manufacturing a physical dental restoration, e.g., an artificial tooth in form of a crown or as part of a bridge. In block 370, the restoration element is manufactured. The manufactured dental restoration is a physical copy of the respective template. The dental restoration may, e.g., be manufactured using a machining device configured to manufacture the dental restoration, e.g., a crown or bridge, by processing a blank of restoration material. The resulting dental restoration may be configured to be retained at an implant using a retaining means, e.g., a screw. For example, the dental restoration may be manufactured using a 3D printing device, i.e., a printer, configured to print the dental restoration element. The resulting dental restoration, e.g., a crown or bridge, may be configured to be retained at an implant using a retaining means, e.g., a screw. For example, the 3D digital restoration model may be used as a positive to define a negative of the physical dental restoration in form of a negative 3D digital restoration model. The negative 3D digital restoration model may be used to manufacture, e.g., using machining or 3D printing, a casting matrix. The casting matrix may, e.g., be configured for casting the physical dental restoration by inserting restoration material into the casting matrix and curing the inserted restoration material. The resulting dental restoration, e.g., a crown or bridge, may be configured to be retained at an implant using a retaining means, e.g., a screw.

The dental restoration manufactured comprises the fastening channel. The fastening channel may, e.g., be implemented during manufacturing. Alternatively, the fastening channel may, e.g., be implemented after the dental restoration has been manufactured using machining, e.g., drilling and/or milling. The restoration material used for manufacturing the dental restoration may, e.g., be a restoration material requiring a hardening, e.g., sintering. For example, the fastening channel may be implemented before hardening the dental restoration.

In case the restoration material is a restoration material requiring a hardening, e.g., sintering, the 3D digital restoration model may be scaled up and the scaled-up version of the 3D digital restoration model may be used as a template for manufacturing the dental restoration. The 3D digital restoration model may be scaled up using a scaling factor, which is an inverse of a shrinking factor quantifying a shrinking of the dental restoration due to the hardening, e.g., sintering. Thus, by scaling up the 3D digital restoration model the shrinking of the dental restoration due to the hardening, e.g., sintering, may be compensated.

Figure 20:
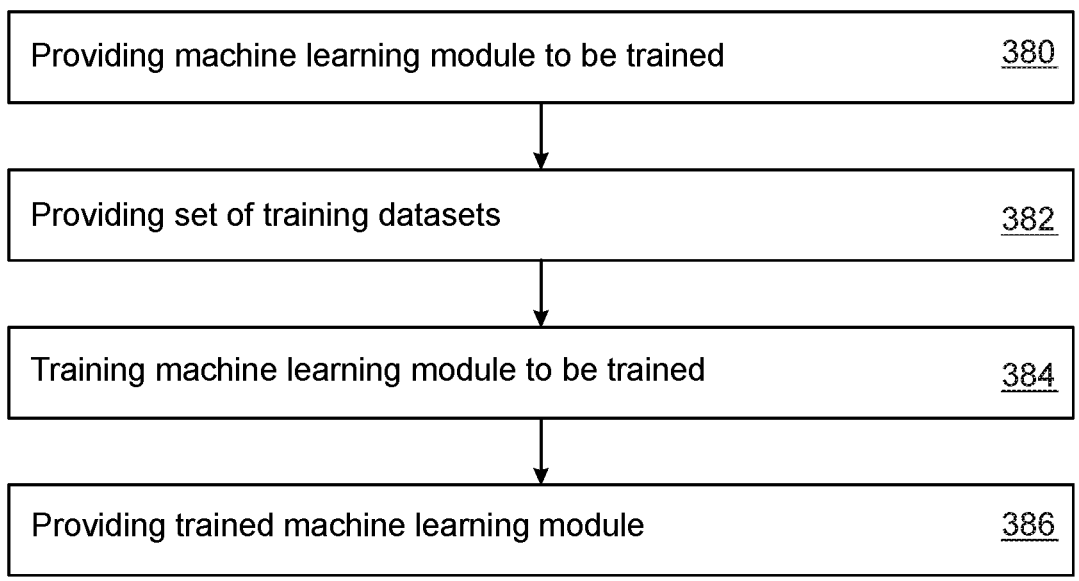
FIG. 20 shows a flowchart illustrating an exemplary method for training a machine learning module to be trained.

FIG. 20 shows a flowchart illustrating an exemplary method for training a machine learning module to be trained. The machine learning module to be trained is trained to provide an adjusted position of the fastening channel within the artificial tooth as an output in response to receiving the 3D digital restoration model of the dental restoration and the definition of a fastening channel as input. In block 380, a machine learning module to be trained is provided. The machine learning module to be trained may, e.g., be an untrained machine learning module, a pre-trained machine learning module or a partially trained machine learning module. In block 382, a set of training datasets for training the machine learning module to be trained is provided. Each training dataset comprises a 3D digital training restoration model of a training dental restoration and a definition of a training fastening channel as well as a definition of an adjusted position of the training fastening channel satisfying the set of one or more positioning criteria. The training datasets may, e.g., furthermore comprise training identifier identifying a required minimum thickness of the restoration material to be used to manufacture the artificial tooth of the dental restoration. Thus, the machine learning module to be trained may further be trained to take into account a minimum thickness of the restoration material for angulating the fastening channel such that the positioning criteria are satisfied.

In block 384, the machine learning module to be trained provided in block 380 is trained using the set of training datasets provided in block 382. The machine learning module to be trained is trained to provide to provide the definitions of the adjusted positions of the training fastening channels of the training datasets as an output in response to receiving the 3D digital training restoration models and the definitions of the training fastening channels of the respective training datasets as input. In block 386, the trained machine learning module resulting from block 384 is provide. The trained machine learning module may be used for automatically adjusting the position of the fastening channel.

Figure 21:
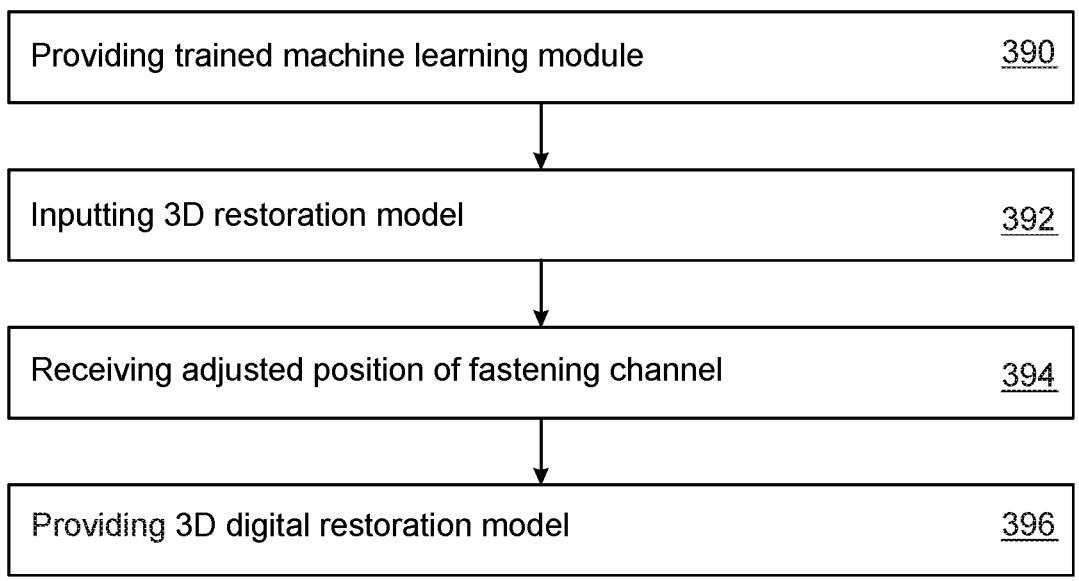
FIG. 21 shows a flowchart illustrating an exemplary method for using a trained machine learning module.

FIG. 21 shows a flowchart illustrating an exemplary method for using a trained machine learning module. In block 390, the trained machine learning module is provided. The providing may, e.g., comprise a training of a machine learning module to be trained as shown in FIG. 20. The trained machine learning module may be configured to provide an adjusted position of the fastening channel within the artificial tooth as an output in response to receiving the 3D digital restoration model of the dental restoration and a definition of a fastening channel as input. In block 392, the 3D digital restoration model of the dental restoration with a definition of a fastening channel is input into the trained machine learning module. Thus, the trained machine learning module receives the 3D digital restoration model of the dental restoration with the definition of the fastening channel as input. For example, the input may further comprise an identifier identifying a required minimum thickness of the restoration material to be used to manufacture the artificial tooth of the dental restoration.

In block 394, an adjusted position of the fastening channel within the artificial tooth is received from the trained machine learning module as output in response to the inputting of the 3D digital restoration model of the dental restoration with the definition of the fastening channel. Thus, the trained machine learning module outputs the adjusted position of the fastening channel within the artificial tooth in response to the receiving of the 3D digital restoration model of the dental restoration with the definition of the fastening channel. In block 396, the adjusted position of the fastening channel within the artificial tooth is provided. For example, the 3D digital restoration model with the adjusted fastening channel within the artificial tooth is provided for manufacturing a physical copy thereof.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for configuring a fastening channel through a dental restoration for fastening a retaining means retaining the dental restoration, the method comprising:

receiving a 3D digital restoration model of the dental restoration, the dental restoration comprising an artificial tooth;

receiving a definition of an implant configured to receive the retaining means to retain the dental restoration on the implant, the definition of the implant comprising a central longitudinal axis of the implant;

determining a relative positioning of the dental restoration relative to the implant;

determining a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;

in case the position of the fastening channel violating a set of one or more pre-defined positioning criteria, automatically adjusting the position of the fastening channel within the artificial tooth by angulating the fastening channel such that the positioning criteria are satisfied, the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel.

2. The method of feature combination 1, the angulating of the fastening channel further comprising defining a first length of the second straight section being equal to a pre-defined length.

3. The method of feature combination 2, the pre-defined length depending on one or more of the following: a length of a head of the retaining means; a length of the retaining means.

4. The method of feature combination 1, the angulating of the fastening channel further comprising defining the first length of the second straight section being equal to or larger than a first minimum threshold, while the second length being equal to or larger than a second minimum threshold.

5. The method of feature combination 4, the first minimum threshold depending on one or more of the following: the length of the head of the retaining means; the length of the retaining means.

6. The method of any of feature combinations 4 to 5, the first length further being defined such that furthermore one or more of the following being satisfied: the first length being equal to or smaller than a first maximum threshold; the second length being equal to or smaller than a second maximum threshold.

7. The method of any of the preceding feature combinations, the angulating of the fastening channel further comprising rotating the fastening channel around the central longitudinal axis of the implant.

8. The method of any of the preceding feature combinations, the fastening channel for which the position being determined being a straight channel with the position of the fastening channel being defined as a straight extension of a central longitudinal axis of the implant extending through the dental restauration with the artificial tooth.

9. The method of any of the preceding feature combinations, the fastening channel for which the position being determined being a pre-tilted fastening channel with the first straight section being pre-tilted relative to the second straight section.

10. The method of feature combination 9, further comprising receiving a user input defining the pre-tilted fastening channel.

11. The method of any of the preceding feature combinations, further comprising dynamically displaying the automatically adjusting of the position of the fastening channel.

12. The method of any of the preceding feature combinations, the method further comprising:
re-positioning the dental restoration relative to the implant, while maintaining the position of the fastening channel relative to the implant;
determining the position of the fastening channel relative to the re-positioned dental restoration;
in case the position of the fastening channel extending through the re-positioned dental restoration with the artificial tooth violating the set of one or more pre-defined positioning criteria, automatically adjusting the angulation of the fastening channel such that the positioning criteria are satisfied.

13. The method of feature combination 12, the adjusting of the angulation of the fastening channel to satisfy the set of one or more pre-defined positioning criteria for the re-positioned dental restoration comprising one or more of the following: adjusting the tilting of the first straight section relative to the second straight section; adjusting the first length of the second straight section; rotating the fastening channel around the central longitudinal axis of the implant.

14. The method of any of the preceding feature combinations, the method further comprising:
amending the dental restoration comprising amending the shape of the artificial tooth of the dental restoration, while maintaining the position of the fastening channel relative to the implant;
determining the position of the fastening channel relative to the amended dental restoration;
in case the position of the fastening channel extending through the amended artificial tooth violating the set of one or more pre-defined positioning criteria, automatically adjusting the angulation of the fastening channel such that the positioning criteria are satisfied.

15. The method of feature combination 14, the adjusting of the angulation of the fastening channel to satisfy the set of one or more pre-defined positioning criteria for the amended dental restoration comprising one or more of the following: adjusting the tilting of the first straight section relative to the second straight section; adjusting the first length of the second straight section; rotating the fastening channel around the central longitudinal axis of the implant.

16. The method of any of the preceding feature combinations, the method further comprising:
re-positioning the implant relative to the dental restoration, while maintaining the position of the fastening channel relative to the implant;
determining the position of the re-positioned fastening channel relative to the dental restoration;
in case the position of the re-positioned fastening channel extending through the artificial tooth violating the set of one or more pre-defined positioning criteria, automatically adjusting the angulation of the fastening channel such that the positioning criteria are satisfied.

17. The method of feature combination 16, the adjusting of the angulation of the fastening channel to satisfy the set of one or more pre-defined positioning criteria for the re-positioned implant comprising one or more of the following: adjusting the tilting of the first straight section relative to the second straight section; adjusting the first length of the second straight section; rotating the fastening channel around the central longitudinal axis of the implant.

18. The method of any of the preceding feature combinations, further receiving a 3D digital dentition model of at least a part of a dentition of a patient, the definition of the implant defining a position of the implant within the 3D digital dentition model.

19. The method of feature combination 18, the relative positioning of the dental restoration relative to the implant being determined using the 3D digital dentition model.

20. The method of any of feature combinations 18 to 19, the 3D digital dentition model comprising at least part of one of the following: a mandibular dental arch, a mandibular bone, a maxillary dental arch, a maxillary bone.

21. The method of any of the preceding feature combinations, the definition of the implant comprising a 3D digital implant model of the implant.

22. The method of any of the preceding feature combinations, the positioning criteria comprising one or more of the following:
- a material thickness of a material of the artificial tooth extending radially at all sides around the fastening channel being exceeding a pre-defined material depending minimum thickness;
- the material thickness of the material of the artificial tooth extending radially at all sides around the fastening channel being maximized, while the mouth of the fastening channel being located within a first section of the outer surface of the artificial tooth;
- the mouth of the fastening channel being located within a second section of the outer surface of the artificial tooth, the second section being assigned as sufficiently restricting a visibility of the mouth from outside an oral cavity of the patient;
- the mouth of the fastening channel being located within a third section of the outer surface of the artificial tooth, the third section assigned as being accessible for a fastening means;
- the first straight section of the fastening channel pointing towards a center of the oral cavity of the patient.

23. The method of feature combination 22, further comprising determining the second section of the outer surface of the artificial tooth using the 3D digital dentition model.

24. The method of any of feature combinations 22 to 23, further comprising determining the third section of the outer surface of the artificial tooth using the 3D digital dentition model.

25. The method of any of feature combinations 22 to 24, further comprising using the 3D digital dentition model to determine, whether the first straight section of the fastening channel is pointing towards the center of the oral cavity of the patient 26. The method of any of feature combinations 22 to 25, the first section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

27. The method of any of feature combinations 22 to 26, the second section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

28. The method of any of feature combinations 22 to 27, the second section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

29. The method of any of feature combinations 22 to 28, the first section being identical with at least one of the following: the second section, the third section.

30. The method of any of feature combinations 22 to 29, the set of criteria comprising a plurality of positioning criteria, the positioning criteria of the plurality of positioning criteria being weighted relative to each other using weight factors being assigned to the individual positioning criteria.

31. The method of any of the preceding feature combinations, further comprising determining a tilt angle of the tilting of the first straight section relative to the second straight section such that a resulting total tilt angle of the first straight section relative to the second straight section being equal to or smaller than a third maximum threshold.

32. The method of any of the preceding feature combinations, the tilt angle of the tilting of the first straight section relative to the second straight section being determined such that a resulting total tilt angle of the first straight section relative to the second straight section being minimized.

33. The method of any of the preceding feature combinations, further comprising using the 3D digital dentition model for determining the tilt angle of the tilting of the first straight section relative to the second straight section such that the mouth of the fastening channel being located in direction along the dental arch of the patient in a middle of the artificial tooth.

34. The method of any of the preceding feature combinations, further comprising using a trained machine learning module for automatically adjusting the position of the fastening channel, the trained machine learning module being configured to provide an adjusted position of the fastening channel within the artificial tooth as an output in response to receiving the 3D digital restoration model of the dental restoration and a definition of a fastening channel as input.

35. The method of feature combination 34, further comprising providing the trained machine learning module, the providing of the trained machine learning module comprising:
- receiving a machine learning module to be trained;
- receiving a set of training datasets for training the machine learning module to be trained, each training dataset comprising a 3D digital training restoration model of a training dental restoration and a definition of a training fastening channel as well as a definition of an adjusted position of the training fastening channel satisfying the set of one or more positioning criteria;
- training the machine learning module to be trained to provide the definitions of the adjusted positions of the training fastening channels of the training datasets as an output in response to receiving the 3D digital training restoration models and the definitions of the training fastening channels of the respective training datasets as input.

36. The method of any of the preceding feature combinations, further comprising indicating an area of the outer surface of the artificial tooth with the position of the fastening channel satisfying the set of one or more pre-defined positioning criteria, when the mouth of the fastening channel being located within the indicated area.

37. The method of any of the preceding feature combinations, the artificial tooth of the dental restoration retained by the retaining means being a crown.

38. The method of any of feature combinations 1 to 36, the artificial tooth of the dental restoration retained by the retaining means being part of a bridge.

39. The method of any of the preceding feature combinations, the dental restoration retained by the retaining means comprising an abutment.

40. The method of any of the preceding feature combinations, the retaining means comprising a screw.

41. The method of any of the preceding feature combinations, further comprising manufacturing the dental restoration using the 3D digital restoration model as template, the manufactured dental restoration being a physical copy of the respective template.

42. The method of feature combination 41, the restoration element being manufactured using one of the following: machining, 3D printing, casting.

43. A computer program product for configuring a fastening channel through a dental restoration for fastening a retaining means retaining the dental restoration,
the computer program product comprising a computer readable storage medium having program instructions embodied therewith, the program instructions being executable by a processor of a computer device to cause the computer device to:
receive a 3D digital restoration model of the dental restoration, the dental restoration comprising an artificial tooth;
receive a definition of an implant configured to receive the retaining means to retain the dental restoration on the implant, the definition of the implant comprising a central longitudinal axis of the implant;
determine a relative positioning of the dental restoration relative to the implant;
determine a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;
in case the position of the fastening channel violating a set of one or more pre-defined positioning criteria, automatically adjust the position of the fastening channel by angulating the fastening channel such that the positioning criteria are satisfied,
the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel.

44. A computer device for configuring a fastening channel through a dental restoration for fastening a retaining means retaining the dental restoration,
the computer device comprising a processor and a memory storing program instructions executable by the processor, execution of the program instructions by the processor causing the computer device to:
receive a 3D digital restoration model of the dental restoration, the dental restoration comprising an artificial tooth;
receive a definition of an implant configured to receive the retaining means to retain the dental restoration on the implant, the definition of the implant comprising a central longitudinal axis of the implant;
determine a relative positioning of the dental restoration relative to the implant;
determine a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;
in case the position of the fastening channel violating a set of one or more pre-defined positioning criteria, automatically adjust the position of the fastening channel by angulating the fastening channel such that the positioning criteria are satisfied,
the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel.

45. A manufacturing system comprising the computer device of feature combination 44, the manufacturing system further comprising one or more manufacturing devices configured to manufacture the dental restoration,
execution of the program instructions by the processor further causing the computer device to control the one or more manufacturing devices to manufacture the dental restoration using the 3D digital restoration model as template, the manufactured dental restoration being a physical copy of the respective template.

46. The manufacturing system of feature combination 45, the one or more manufacturing devices being one or more of the following: one or more machining devices, one or more 3D printing devices.

LIST OF REFERENCE NUMERALS 10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements 54 hardware device
56 keyboard
58 mouse
59 scanner
60 3D printing device
62 printing element
70 machining device
72 machining tool
74 holding device
76 blank
78 raw material
100 screw
102 3D digital artificial tooth model
103 artificial tooth
104 mouth
105 dental restoration
106 abutment
107 3D digital implant model
108 implant
110 screw driver
111 screwing end of screw driver
112 3D digital dentition model
114 oral cavity
116 center of oral cavity
120 central longitudinal axis of implant
130 fastening channel
132 first straight section
134 second straight section
140 surface section
α tilt angle
D minimum thickness
L1 first length
L2 second length

The invention claimed is:

1. A computer-implemented method for configuring a fastening channel through a dental restoration of a patient for fastening a retaining means retaining the dental restoration, the method comprising:
receiving a 3D digital restoration model of the dental restoration of the patient, the dental restoration comprising an artificial tooth;
receiving a definition of an implant configured to receive the retaining means to retain the dental restoration on the implant based on at least a part of a dentition of the patient, the definition of the implant comprising a central longitudinal axis of the implant;
determining a relative positioning of the dental restoration relative to the implant;
determining a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;
in case the position of the fastening channel violating a set of one or more pre-defined positioning criteria, automatically adjusting the position of the fastening channel within the artificial tooth by angulating the fastening channel such that the positioning criteria are satisfied,
the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel, and
manufacturing the dental restoration using the 3D digital restoration model as template, the manufactured dental restoration being a physical copy of the respective template.

2. The method of claim 1, the angulating of the fastening channel further comprising defining a first length of the second straight section being equal to a pre-defined length.

3. The method of claim 2, the pre-defined length depending on one or more of the following: a length of a head of the retaining means; a length of the retaining means.

4. The method of claim 1, the angulating of the fastening channel further comprising defining a first length of the second straight section being equal to or larger than a first minimum threshold, while a second length being equal to or larger than a second minimum threshold.

5. The method of claim 4, the first minimum threshold depending on one or more of the following: the length of the head of the retaining means; the length of the retaining means.

6. The method of claim 4, the first length further being defined such that furthermore one or more of the following being satisfied: the first length being equal to or smaller than a first maximum threshold; the second length being equal to or smaller than a second maximum threshold.

7. The method of claim 1, the angulating of the fastening channel further comprising rotating the fastening channel around the central longitudinal axis of the implant.

8. The method of claim 1, the fastening channel for which the position being determined being a straight channel with the position of the fastening channel being defined as a straight extension of a central longitudinal axis of the implant extending through the dental restauration with the artificial tooth.

9. The method of claim 1, the fastening channel for which the position being determined being a pre-tilted fastening channel with the first straight section being pre-tilted relative to the second straight section.

10. The method of claim 9, further comprising receiving a user input defining the pre-tilted fastening channel.

11. The method of claim 1, further comprising the dynamically displaying the automatically adjusting of the position of the fastening channel.

12. The method of claim 1, the method further comprising:
re-positioning the dental restoration relative to the implant, while maintaining the position of the fastening channel relative to the implant;
determining the position of the fastening channel relative to the re-positioned dental restoration;
in case the position of the fastening channel extending through the re-positioned dental restoration with the artificial tooth violating the set of one or more pre-defined positioning criteria, automatically adjusting the angulation of the fastening channel such that the positioning criteria are satisfied.

13. The method of claim 12, the adjusting of the angulation of the fastening channel to satisfy the set of one or more pre-defined positioning criteria for the re-positioned dental restoration comprising one or more of the following: adjusting the tilting of the first straight section relative to the second straight section; adjusting the first length of the second straight section; rotating the fastening channel around the central longitudinal axis of the implant.

14. The method of claim 1, the method further comprising:
amending the dental restoration comprising amending the shape of the artificial tooth of the dental restoration, while maintaining the position of the fastening channel relative to the implant;
determining the position of the fastening channel relative to the amended dental restoration;
in case the position of the fastening channel extending through the amended artificial tooth violating the set of one or more pre-defined positioning criteria, automatically adjusting the angulation of the fastening channel such that the positioning criteria are satisfied.

15. The method of claim 14, the adjusting of the angulation of the fastening channel to satisfy the set of one or more pre-defined positioning criteria for the amended dental restoration comprising one or more of the following: adjusting the tilting of the first straight section relative to the second straight section; adjusting the first length of the second straight section; rotating the fastening channel around the central longitudinal axis of the implant.

16. The method of claim 1, the method further comprising:
re-positioning the implant relative to the dental restoration, while maintaining the position of the fastening channel relative to the implant;
determining the position of the re-positioned fastening channel relative to the dental restoration;
in case the position of the re-positioned fastening channel extending through the artificial tooth violating the set of one or more pre-defined positioning criteria, automatically adjusting the angulation of the fastening channel such that the positioning criteria are satisfied.

17. The method of claim 16, the adjusting of the angulation of the fastening channel to satisfy the set of one or more pre-defined positioning criteria for the re-positioned implant comprising one or more of the following: adjusting the tilting of the first straight section relative to the second straight section; adjusting the first length of the second straight section; rotating the fastening channel around the central longitudinal axis of the implant.

18. The method of claim 1, further receiving a 3D digital dentition model of the at least a part of the dentition of the patient, the definition of the implant defining a position of the implant within the 3D digital dentition model.

19. The method of claim 18, the relative positioning of the dental restoration relative to the implant being determined using the 3D digital dentition model.

20. The method of claim 18, the 3D digital dentition model comprising at least part of one of the following: a mandibular dental arch, a mandibular bone, a maxillary dental arch, a maxillary bone.

21. The method of claim 1, the definition of the implant comprising a 3D digital implant model of the implant.

22. The method of claim 1, the positioning criteria comprising one or more of the following:
a material thickness of a material of the artificial tooth extending radially at all sides around the fastening channel being exceeding a pre-defined material depending minimum thickness;
the material thickness of the material of the artificial tooth extending radially at all sides around the fastening channel being maximized, while the mouth of the fastening channel being located within a first section of the outer surface of the artificial tooth;
the mouth of the fastening channel being located within a second section of the outer surface of the artificial tooth, the second section being assigned as sufficiently restricting a visibility of the mouth from outside an oral cavity of the patient;
the mouth of the fastening channel being located within a third section of the outer surface of the artificial tooth, the third section assigned as being accessible for a fastening means;
the first straight section of the fastening channel pointing towards a center of the oral cavity of the patient.

23. The method of claim 22, further comprising determining the second section of the outer surface of the artificial tooth using the 3D digital dentition model.

24. The method of claim 22, further comprising determining the third section of the outer surface of the artificial tooth using the 3D digital dentition model.

25. The method of claim 22, further comprising using the 3D digital dentition model to determine, whether the first straight section of the fastening channel is pointing towards the center of the oral cavity of the patient.

26. The method of claim 22, the first section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

27. The method of claim 22, the second section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

28. The method of claim 22, the second section of the outer surface of the artificial tooth being comprised by one of the following: a lingual surface, in case the artificial tooth being a mandibular incisor; a palatal surface, in case the artificial tooth being a maxillary incisor; an occlusal surface, in case the artificial tooth being a molar.

29. The method of claim 22, the first section being identical with at least one of the following: the second section, the third section.

30. The method of claim 22, the set of criteria comprising a plurality of positioning criteria, the positioning criteria of the plurality of positioning criteria being weighted relative to each other using weight factors being assigned to the individual positioning criteria.

31. The method of claim 1, further comprising determining a tilt angle of the tilting of the first straight section relative to the second straight section such that a resulting total tilt angle of the first straight section relative to the second straight section being equal to or smaller than a third maximum threshold.

32. The method of claim 1, the tilt angle of the tilting of the first straight section relative to the second straight section being determined such that a resulting total tilt angle of the first straight section relative to the second straight section being minimized.

33. The method of claim 1, further comprising using the 3D digital dentition model for determining the tilt angle of the tilting of the first straight section relative to the second straight section such that the mouth of the fastening channel being located in direction along the dental arch of the patient in a middle of the artificial tooth.

34. The method of claim 1, further comprising using a trained machine learning module for automatically adjusting the position of the fastening channel, the trained machine learning module being configured to provide an adjusted position of the fastening channel within the artificial tooth as an output in response to receiving the 3D digital restoration model of the dental restoration and a definition of a fastening channel as input.

35. The method of claim 34, further comprising providing the trained machine learning module, the providing of the trained machine learning module comprising:
receiving a machine learning module to be trained;
receiving a set of training datasets for training the machine learning module to be trained, each training dataset comprising a 3D digital training restoration model of a training dental restoration and a definition of a training fastening channel as well as a definition of an adjusted position of the training fastening channel satisfying the set of one or more positioning criteria;
training the machine learning module to be trained to provide the definitions of the adjusted positions of the training fastening channels of the training datasets as an output in response to receiving the 3D digital training restoration models and the definitions of the training fastening channels of the respective training datasets as input.

36. The method of claim 1, further comprising indicating an area of the outer surface of the artificial tooth with the position of the fastening channel satisfying the set of one or more pre-defined positioning criteria, when the mouth of the fastening channel being located within the indicated area.

37. The method of claim 1, the artificial tooth of the dental restoration retained by the retaining means being a crown.

38. The method of claim 1, the artificial tooth of the dental restoration retained by the retaining means being part of a bridge.

39. The method of claim 1, the dental restoration retained by the retaining means comprising an abutment.

40. The method of claim 1, the retaining means comprising a screw.

41. The method of claim 1, the restoration element being manufactured using one of the following: machining, 3D printing, casting.

42. A computer program product for configuring a fastening channel through a dental restoration of a patient for fastening a retaining means retaining the dental restoration,
the computer program product comprising a non-transitory computer readable storage medium having program instructions embodied therewith, the program instructions being executable by a processor of a computer device to cause the computer device to:
receive a 3D digital restoration model of the dental restoration of the patient, the dental restoration comprising an artificial tooth;
receive a definition of an implant configured to receive the retaining means to retain the dental restoration on the implant based on at least a part of a dentition of the patient, the definition of the implant comprising a central longitudinal axis of the implant;
determine a relative positioning of the dental restoration relative to the implant;
determine a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;
in case the position of the fastening channel violating a set of one or more pre-defined positioning criteria, automatically adjust the position of the fastening channel by angulating the fastening channel such that the positioning criteria are satisfied,
the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel, and
manufacture the dental restoration using the 3D digital restoration model as template, the manufactured dental restoration being a physical copy of the respective template.

43. A computer device for configuring a fastening channel through a dental restoration of a patient for fastening a retaining means retaining the dental restoration,
the computer device comprising a processor and a memory storing program instructions executable by the processor, execution of the program instructions by the processor causing the computer device to:
receive a 3D digital restoration model of the dental restoration of the patient, the dental restoration comprising an artificial tooth;
receive a definition of an implant configured to receive the retaining means to retain the dental restoration on the implant based on at least a part of a dentition of the patient, the definition of the implant comprising a central longitudinal axis of the implant;
determine a relative positioning of the dental restoration relative to the implant;
determine a position of the fastening channel extending from the implant through the artificial tooth, the fastening channel comprising a first end and a second end, the first end being a connecting end providing a connection to the implant, the second end being a mouth within an outer surface of the artificial tooth configured for receiving a fastening means for fastening the retaining means to retain the dental restoration on the implant;
in case the position of the fastening channel violating a set of one or more pre-defined positioning criteria, automatically adjust the position of the fastening channel by angulating the fastening channel such that the positioning criteria are satisfied,
the angulating of the fastening channel comprising tilting a first straight section of the fastening channel relative to a second straight section of the fastening channel, the second straight section being a straight extension of the central longitudinal axis of the implant extending from the first end of the fastening channel to the first straight section, the first straight section extending from the second straight section to the second end of the fastening channel, and
manufacture the dental restoration using the 3D digital restoration model as template, the manufactured dental restoration being a physical copy of the respective template.

44. A manufacturing system comprising the computer device of claim 43, the manufacturing system further comprising one or more manufacturing devices configured to manufacture the dental restoration, execution of the program instructions by the processor further causing the computer device to control the one or more manufacturing devices to manufacture the dental restoration using the 3D digital restoration model as template, the manufactured dental restoration being a physical copy of the respective template.

45. The manufacturing system of claim 44, the one or more manufacturing devices being one or more of the following: one or more machining devices, one or more 3D printing devices.

\* \* \* \* \*